United States Patent
Snyder et al.

(10) Patent No.: US 9,827,712 B2
(45) Date of Patent: Nov. 28, 2017

(54) METHOD OF PRINTING GRAYSCALE AND FULL-COLOR 3D ARTICLES

(71) Applicant: 3D Systems, Incorporated, Rock Hill, SC (US)

(72) Inventors: Trevor Snyder, Newberg, OR (US); Don Titterington, Wilsonville, OR (US); Chengsung Chan, West Linn, OR (US)

(73) Assignee: 3D Systems, Inc., Rock Hill, SC (US)

( * ) Notice: Subject to any disclaimer, the term of this patent is extended or adjusted under 35 U.S.C. 154(b) by 254 days.

(21) Appl. No.: 14/734,401

(22) Filed: Jun. 9, 2015

(65) Prior Publication Data

US 2015/0352783 A1   Dec. 10, 2015

Related U.S. Application Data

(60) Provisional application No. 62/009,723, filed on Jun. 9, 2014.

(51) Int. Cl.
| | |
|---|---|
| *B29C 41/02* | (2006.01) |
| *B29C 67/00* | (2017.01) |
| *B33Y 10/00* | (2015.01) |

(52) U.S. Cl.
CPC ...... *B29C 67/0059* (2013.01); *B29C 67/0007* (2013.01); *B29C 67/0055* (2013.01); *B29K 2995/002* (2013.01); *B33Y 10/00* (2014.12)

(58) Field of Classification Search
CPC .................................................. B29C 67/0059
USPC .......................................................... 264/308
See application file for complete search history.

(56) References Cited

U.S. PATENT DOCUMENTS

| | | | |
|---|---|---|---|
| 5,710,827 A * | 1/1998 | Perumal, Jr. ............. | H04N 1/52 358/534 |
| 2005/0072113 A1 | 4/2005 | Collins et al. | |
| 2013/0095302 A1 | 4/2013 | Pettis et al. | |

OTHER PUBLICATIONS

Pct International Search Report the International Searching Authority for PCT/US2015/034843, mailed Sep. 8, 2015 (4 pages).
PCT Written Opinion of the International Searching Authority for PCT/US2015/034843, mailed Sep. 8, 2015 (5 pages).

* cited by examiner

*Primary Examiner* — Leo B Tentoni

(57) ABSTRACT

In one aspect, methods of printing a 3D article are described herein. In some embodiments, a method of printing a 3D article comprises selectively depositing a first portion of build material in a fluid state onto a substrate to form a first region of build material; selectively depositing a first portion of support material in a fluid state to form a first region of support material; and selectively depositing a second portion of build material in a fluid state to form a second region of build material, wherein the first region of support material is disposed between the first region of build material and the second region of build material in a z-direction of the article. In some cases, the first region of support material forms a grayscale pattern and/or a CMY color pattern in combination with the first region of build material and/or the second region of build material.

21 Claims, 9 Drawing Sheets

METHOD OF PRINTING GRAYSCALE AND FULL-COLOR 3D ARTICLES

CROSS REFERENCE TO RELATED APPLICATIONS

This application claims priority pursuant to 35 U.S.C. §119 to U.S. Provisional Patent Application Ser. No. 62/009,723, filed on Jun. 9, 2014, which is hereby incorporated by reference in its entirety.

FIELD

The present invention relates to methods of printing three-dimensional (3D) articles or objects and, in particular, to methods of printing 3D articles having grayscale and/or CMY colorization.

BACKGROUND

Commercially available 3D printers, such as the ProJet™ 3D Printers manufactured by 3D Systems of Rock Hill, S.C., use inks, which are also known as build materials, that are jetted through a print head as a liquid to form various 3D objects or parts. Other 3D printing systems also use a build material that is jetted through a print head. In some instances, the build material is solid at ambient temperatures and converts to liquid at elevated jetting temperatures. In other instances, the build material is liquid at ambient temperatures. In addition, 3D printing systems may also use a support material to support one or more portions of an article during the printing process, such as one or more overhangs of the article.

To form grayscale or other multi-colored 3D articles, some 3D printing systems require the use of a plurality of print heads and/or print heads having a plurality of printing or material channels. However, such systems can be expensive and/or complex to operate. Therefore, improved systems and methods for printing 3D articles are needed, including for grayscale and/or full-color applications.

SUMMARY

In one aspect, methods of printing a 3D article are described herein which, in some embodiments, may offer one or more advantages over prior methods. In some embodiments, for example, a method described herein can be used to provide printed articles having improved visual effects or values. Further, in some cases, a method described herein can provide grayscale and/or full-color 3D articles using less expensive and/or less complex equipment and/or materials. A method described herein, in some instances, may also permit the introduction of a desired texture or gloss to a 3D article. Additionally, in some cases, a method of printing a 3D article described herein can provide improved color resolution and/or reduced color-to-color diffusion or "bleed" between adjacent voxels of differing colors.

In some embodiments, a method of printing a 3D article described herein comprises selectively depositing a first portion of build material in a fluid state onto a substrate to form a first region of build material; selectively depositing a first portion of support material in a fluid state to form a first region of support material; and selectively depositing a second portion of build material in a fluid state to form a second region of build material, wherein the first region of support material is disposed between the first region of build material and the second region of build material in a z-direction of the article. In addition, in some cases, the first region of support material forms a grayscale or monochrome pattern in combination with the first region of build material and/or the second region of build material. The grayscale pattern can be a two-dimensional pattern formed on an exterior surface of the article. The grayscale pattern can also be a three-dimensional pattern visible through an exterior surface of the article. Further, a method described herein, in some embodiments, can be used to print 3D articles having grayscale colorization using a print head having only two channels. For example, in some instances, the first and second portions of build material are deposited from a first channel of a print head of a 3D printing system, and the support material is deposited from a second channel of the print head. In this manner, a method described herein can provide a 3D printed article in full grayscale using a monochrome 3D printing system, including a monochrome 3D printing system having a print head using only one build material.

Additionally, in some embodiments, a first region of support material described herein may not form a grayscale pattern in combination with a first and/or second region of build material. Instead, in some cases, a first region of support material can provide a texture or "gloss" to an exterior surface of a 3D article described herein. For example, in some such instances, a method of printing a 3D article comprises selectively depositing a first portion of build material in a fluid state onto a substrate to form a first region of build material; selectively depositing a first portion of support material in a fluid state to form a first region of support material; and selectively depositing a second portion of build material in a fluid state to form a second region of build material, wherein the first region of support material is disposed between the first region of build material and the second region of build material in a z-direction of the article, and wherein the first region of support material forms a texture or gloss pattern in combination with the first region of build material and/or the second region of build material.

A method of printing a 3D article described herein may also be used to provide a multi-color or full-color 3D article, including using a cyan-magenta-yellow (CMY) color model. For example, in some cases, a method of printing a 3D article described herein comprises selectively depositing a first portion of build material in a fluid state onto a substrate to form a first region of build material; selectively depositing a first portion of support material in a fluid state to form a first region of support material; and selectively depositing a second portion of build material in a fluid state to form a second region of build material, wherein the first region of support material is disposed between the first region of build material and the second region of build material in a z-direction of the article, wherein the first and/or second region of build material is formed from a mixture or combination of one or more of a first build material having a cyan color, a second build material having a magenta color, and a third build material having a yellow color under ordinary illumination by visible white light, and wherein the first region of support material is formed from a support material having a white color under ordinary illumination by visible white light. In some such cases, the first region of support material can act as a white or reflective substrate for an additive CMY colorization scheme or model. Further, in some embodiments, the first region of support material forms a CMY color pattern in combination with the first region of build material and/or the second region of build material. The CMY color pattern, in some cases, is a two-dimensional pattern formed on an exterior surface of the article. The CMY color pattern can also be a three-dimensional pattern visible through an exterior surface of the article.

Moreover, a method described herein, in some cases, can be used to print 3D articles having full-color CMY colorization using a print head having only four channels. For example, in some instances, the first and second portions of build material are deposited from first, second, and third channels of a print head of a 3D printing system, and the support material is deposited from a fourth channel of the print head. In some embodiments, the first channel is a cyan build material channel, the second channel is a magenta build material channel, the third channel is a yellow build material channel, and the fourth channel is a white support material channel.

Further, in some embodiments of methods of printing described herein, one or more of the first and second regions of build material and the first region of support material is deposited according to an image of the 3D article in a computer readable format. In addition, in some cases, a method described herein further comprises curing the first and/or second region of build material. Moreover, in some embodiments, a method described herein further comprises cooling the 3D article to solidify the first region of support material.

Further, a method described herein, in some cases, may also comprise supporting at least a portion of at least one of the first and second regions of build material with one or more second regions of support material. Moreover, the first and second regions of support material can be formed from the same support material. In addition, a method described herein, in some embodiments, further comprises removing the one or more second regions of support material from the 3D article.

In another aspect, printed 3D articles are described herein. Such 3D articles, in some cases, can be formed by a method described hereinabove. For example, in some embodiments, a printed 3D article comprises a first region of build material; a first region of support material; and a second region of build material, wherein the first region of support material is disposed between the first region of build material and the second region of build material in a z-direction of the article, and wherein the first region of support material forms a grayscale pattern and/or CMY color pattern in combination with the first region of build material and/or the second region of build material. The grayscale pattern and/or CMY color pattern can be a two-dimensional pattern on an exterior surface of the article. In some embodiments, the first and second regions of build material are formed from the same build material or combination of build materials. Moreover, in some cases, the first and/or second region of build material is formed from a mixture or combination of one or more of a first build material having a cyan color, a second build material having a magenta color, and a third build material having a yellow color under ordinary illumination by visible white light. In addition, in some instances, the first and/or second portion of build material is optically transparent or substantially optically transparent. Further, in some embodiments, the first region of support material is formed from a support material having a white color under ordinary illumination by visible white light.

Additionally, in some instances, the first region of support material may not form a grayscale and/or CMY color pattern in combination with the first and/or second region of build material. Instead, in some cases, a first region of support material described herein can provide a texture or "gloss" to an exterior surface of a 3D article described herein. For example, in some such instances, a printed 3D article comprises a first region of build material; a first region of support material; and a second region of build material, wherein the first region of support material is disposed between the first region of build material and the second region of build material in a z-direction of the article, and wherein the first region of support material forms a texture or gloss pattern in combination with the first region of build material and/or the second region of build material.

Moreover, in some cases, an article described herein further comprises one or more second regions of support material supporting at least a portion of at least one of the first and second regions of build material. In some embodiments, the first and second regions of support material are formed from the same support material.

These and other embodiments are described in greater detail in the detailed description which follows.

DETAILED DESCRIPTION

Figure 1:
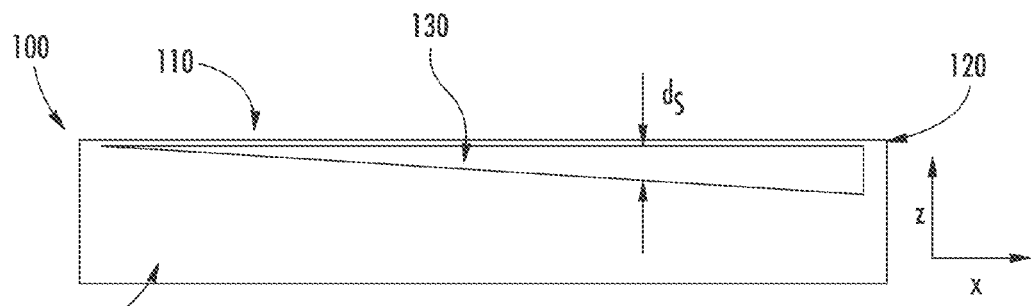
FIG. 1 illustrates schematically a method of providing color values to a 3D article according to one embodiment described herein.

Embodiments described herein can be understood more readily by reference to the following detailed description, examples, and drawings. Elements, apparatus and methods described herein, however, are not limited to the specific embodiments presented in the detailed description, examples, and drawings. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three-dimensional printing system," "three-dimensional printer," "printing," and the like generally describe various solid freeform fabrication techniques for making three-dimensional articles or objects by selective deposition, jetting, fused deposition modeling, multijet modeling, and other techniques now known in the art or that may be known in the future that use a build material or ink to fabricate three-dimensional objects.

I. Methods of Printing a 3D Article Comprising a Grayscale Pattern

In one aspect, methods of printing a 3D article comprising a grayscale pattern are described herein. In some embodiments, a method of printing a 3D article described herein comprises selectively depositing a first portion of build material in a fluid state onto a substrate to form a first region of build material; selectively depositing a first portion of support material in a fluid state to form a first region of support material; and selectively depositing a second portion of build material in a fluid state to form a second region of build material, wherein the first region of support material is disposed between the first region of build material and the second region of build material in a z-direction of the article, and wherein the first region of support material forms a grayscale pattern in combination with the first region of build material and/or the second region of build material. Further, in some embodiments, the grayscale pattern is a two-dimensional pattern formed on an exterior surface of the article or a three-dimensional pattern visible through an exterior surface of the article. Moreover, a grayscale pattern described herein, in some cases, can be provided by normal reflection of light incident on the surface of the article. Alternatively, in other instances, a grayscale pattern can be provided by "backlighting" the surface or article, including by passing light through the article from a side opposite or otherwise different from an exterior surface described herein. Moreover, in some embodiments, the grayscale pattern provided by normal reflection of light may be the reverse or inverse of a grayscale pattern provided by backlighting, where light and dark regions of the patterns are opposite. In addition, in some cases, a surface of a 3D article described herein can have a first grayscale pattern provided by normal reflection of incident light and a second grayscale pattern provided by backlighting the article.

A "z-direction" of an article, for reference purposes herein, comprises a direction orthogonal or substantially orthogonal to an exterior surface of the article. A "substantially orthogonal" direction, for reference purposes herein, comprises a direction that is within about 15 degrees, about 10 degrees, or about 5 degrees of the orthogonal direction. In some embodiments, a z-direction corresponds to the printing direction of a method described herein, such that the 3D printing process is carried out by sequentially stacking layers or cross-sections of build material in the z-direction. Thus, in some such instances, the z-direction can correspond to the height or thickness direction of the printed article. However, in other instances, the z-direction is not necessarily the printing direction.

Similarly, in some embodiments, a region of build material and/or a region of support material can be formed by one or more sequentially deposited layers of the material. Further, in some cases, a region of build material and/or a region of support material can define one or more cross-sections of the 3D article. Alternatively, in other embodiments, a region of build material and/or a region of support material defines or is formed by portions of sequential cross-sections of the article, as described further hereinbelow.

A "grayscale" or "monochrome" pattern, in some cases, comprises a pattern that defines a plurality of shades of a single color. In some instances, the pattern defines a continuous or substantially continuous gradation of lightness or darkness of a single color. It is to be understood that the single color of a "grayscale" or monochrome pattern described herein is not limited to gray but may instead be any color not inconsistent with the objectives of the present disclosure.

In some embodiments of a method described herein, a first region of support material forms a grayscale pattern in combination with a first region of build material. In other cases, a first region of support material forms a grayscale pattern in combination with a second region of build material. Further, a first region of support material can also form a grayscale pattern in combination with both the first and second regions of build material, as described further hereinbelow. Additionally, in some embodiments, a method described herein can be carried out without depositing the second portion of the build material to form the second region of build material. Instead, in some such cases, the first region of support material can form a grayscale pattern in combination with the first region of build material alone, as described further hereinbelow.

A method described herein, in some cases, can be used to print 3D articles having grayscale colorization using a print head having only two channels. For example, in some instances, the first and second portions of the build material are deposited from a first channel of a print head of a 3D printing system, and the support material is deposited from a second channel of the print head. In some cases, the print head comprises an ink jet print head, such as a two-channel ink jet print head. Moreover, in some embodiments, the first channel is a build material channel, and the second channel is a support material channel. A suitable print head to deposit the build material and/or support material, in some embodiments, is the piezoelectric Z850 print head. Additional suitable print heads for the deposition of build material and support material described herein are commercially available from a variety of ink jet printing apparatus manufacturers. For example, the Xerox print head or Ricoh print heads may also be used.

It is to be understood that a "channel" can refer to a mechanism for depositing a single material from a print head. For example, a channel of a print head can refer to a specific material ejection orifice of a print head, alone or in combination with any material conduits, material storage compartments, and/or other hardware or software of a 3D printing system associated with the specific material ejection orifice. A channel can also refer to an entire print head dedicated to printing a single, specific material, alone or in combination with any material conduits, material storage compartments, and/or other hardware or software of a 3D printing system associated with printing the single, specific material from the channel. Thus, in another aspect, 3D printing systems are described herein, including 3D printing systems comprising computer hardware and/or software configured to carry out a method described herein.

In this manner, a method described herein can provide a 3D printed article in full grayscale using a monochrome 3D printing system, including a monochrome 3D printing system having a print head with fewer than three channels and/or using only one build material.

Additionally, a method described herein may also be carried out using a 3D printing system comprising a print head having more than two channels, such as three channels, four channels, five channels, or more than five channels. In some such instances, the first and second portions of build material can comprise the same or different build materials. One or both of the first and second portions of build material may also comprise a mixture or combination of differing build materials, including differing build materials deposited from differing channels of a multi-channel print head. For example, in some embodiments, two or more channels of a print head are used to deposit two or more differing build materials onto a substrate to form a first region of build material. Similarly, two or more channels of a print head may also be used to deposit two or more build materials to form a second region of build material. In some such cases, the differing build materials can be colored or pigmented build materials mixed or combined to provide a desired color to a region of build material.

Thus, in some instances, the first and/or second portion of build material comprises a colorant. For example, in some embodiments, the first portion of build material comprises one or more first colorants and the second portion of build material comprises one or more second colorants. In such cases, the first and second colorants can be the same or different from one another. In general, any combination of first and second colorants not inconsistent with the objectives of the present disclosure may be used. Further, in some cases, the first region of support material is formed from a support material that is white under ordinary illumination by visible white light. Thus, in some embodiments, a method described herein can be used to provide a grayscaling of any desired color of build material not inconsistent with the objectives of the present disclosure.

Further, in some embodiments of a method described herein, a first region of support material is completely or substantially completely covered by a second region of build material in a z-direction. A first region of support material that is "substantially" completely covered, in some cases, can be at least about 70% covered, at least about 80% covered, at least about 85% covered, at least about 90% covered, at least about 95% covered, at least about 98% covered, or at least about 99% covered, based on the total surface area of the first region of support material.

Additionally, in some embodiments, the first and/or second portion of build material is optically transparent or substantially optically transparent, including in the visible region of the electromagnetic spectrum. In some cases, for instance, the first and/or second portion of build material has an optical transparency of at least about 70%, at least about 80%, at least about 90%, at least about 95%, at least about 98%, or at least about 99% transmission between about 350 nm and about 750 nm, at a given thickness, such as a thickness of about 0.01 to 10 mm, about 0.03 to 10 mm, 0.05 to 10 mm, 0.1 to 10 mm, 0.3 to 0.8 mm, 0.5 to 10 mm, 1 to 10 mm, or 5 to 10 mm. In some cases, a first and/or second portion of build material described herein has an optical transparency between about 70% and about 95%, between about 80% and about 99.99%, or between about 90% and about 95% transmission at wavelengths between about 350 nm and about 750 nm, at a given thickness, such as a thickness described above. First and/or second portions of build material having an optical transparency described herein can facilitate the formation of a color pattern or colorization process described herein.

Various grayscale patterns can be provided according to a method described herein. In some embodiments, for instance, a grayscale pattern is formed by varying the thickness of the first region of support material and/or the thickness of the second region of build material in one or more lateral directions. "Lateral" directions, for reference purposes herein, include directions parallel or substantially parallel to a surface of a printed article formed by a method described herein. For example, such lateral directions can be described as an x-direction and/or a y-direction of the surface, where the z-direction corresponds to a direction orthogonal or substantially orthogonal to the surface of the article. Thus, lateral directions can be perpendicular or substantially perpendicular to the z-direction of a printed article described herein.

As described above, in some embodiments, a grayscale pattern is formed by varying the thickness of a first region of support material and/or the thickness of a second region of build material in one or more lateral directions. In some cases, the thickness of the first region of support material is varied in one or more lateral directions. In other instances, the thickness of the second region of build material is varied in one or more lateral directions. In still other embodiments, the thickness of the first region of support material and the thickness of the second region of build material are each varied in one or more lateral directions. In some such instances, the variation of the thicknesses of the first region of support material and the variation of the thickness of the second region of the build material can together provide a 3D article having a first grayscale pattern provided by normal reflection of incident light and a second grayscale pattern provided by backlighting the article. Moreover, a variation in thickness of a region described herein can be a continuous or substantially continuous variation. Alternatively, in other instances, the variation in thickness can be discrete or non-continuous. In some cases, the variation exhibits a step-function profile. In other instances, the variation is stochastic.

Figure 2:
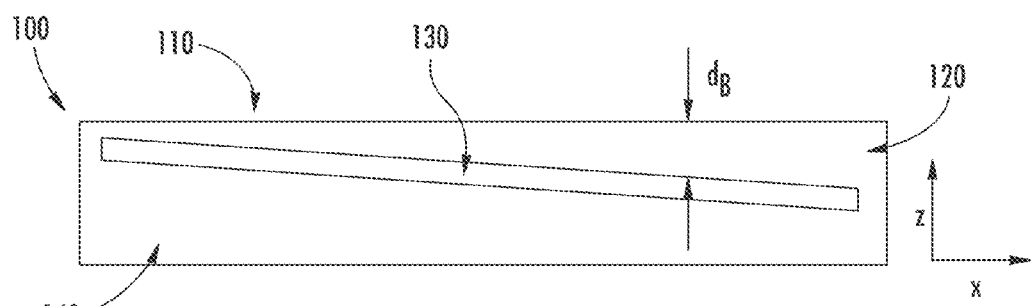
FIG. 2 illustrates schematically a method of providing color values to a 3D article according to one embodiment described herein.

FIGS. 1 and 2 schematically illustrate sectional views of two embodiments of a method of forming a grayscale pattern in a manner described above. With reference to FIG. 1 and FIG. 2, a 3D article (100) comprises an exterior surface (110). The z-direction is orthogonal to the exterior surface (110). A first region of build material (140) and a second region of build material (120) embed a first region of support material (130) disposed in between the first region of build material (140) and the second region of build material (120). In the embodiment of FIG. 1, the thickness of the first region of support material ($d_S$) varies in a lateral direction (x) orthogonal to the z-direction, but the thickness of the second region of build material (120) is constant or substantially constant in the lateral direction (x). In contrast, in the embodiment of FIG. 2, the thickness of the second region of build material ($d_B$) varies in a lateral direction (x)

orthogonal to the z-direction, but the thickness of the first region of support material (130) is constant or substantially constant in the lateral direction (x). Either arrangement can provide a grayscale effect on the surface (110) of the article (100). In addition, as described above, it is also possible to vary both the thickness of the first region of support material ($d_S$) and the thickness of the second region of build material ($d_B$). In the embodiment of FIG. 1, the highest lightness values are observed on the right side of the surface (110), where the thickness of the first region of support material ($d_S$) is greatest (for front lighting or normal reflectance). In contrast, in the embodiment of FIG. 2, the highest lightness values are observed on the left side of the surface (110), where the thickness of the second region of build material ($d_B$) is least (again, for front lighting or normal reflectance, as opposed to back lighting). As depicted in FIGS. 1 and 2, the exterior surface (110) is substantially planar. However, it is to be understood that a surface of an article described herein can also be curved. Moreover, a surface of an article described herein can have a complex topography including both planar and angular portions and/or other topographical features. In addition, a surface of an article described herein can be flat or angled or have other structural features at the microstructural level as well as the macrostructural level, such as at the pixel or voxel level.

The first region of support material and the second region of build material can have any absolute and/or relative thickness values not inconsistent with the objectives of the present disclosure. In some cases, the first region of support material and/or the second region of build material has an average thickness of about 0.1 mm to about 10 mm, about 0.1 mm to about 5 mm, about 0.1 mm to about 3 mm, about 0.1 mm to about 1 mm, about 0.5 mm to about 10 mm, about 0.5 mm to about 5 mm, about 0.5 mm to about 3 mm, or about 0.5 mm to about 1 mm. In some embodiments, the first region of support material and/or the second region of build material has an average thickness greater than about 10 mm or less than about 0.1 mm. For example, in some cases, the first region of support material and/or the second region of build material has an average thickness as small as the printing resolution of the 3D printing system used to carry out a method described herein. In some such embodiments, the first region of support material and/or the second region of build material is formed or defined by a single layer or cross-section of material. Further, in some instances, the thickness of the first region of support material and/or the thickness of the second region of build material can vary by about 0.1 mm to about 10 mm, about 0.1 mm to about 5 mm, about 0.1 mm to about 3 mm, about 0.1 mm to about 1 mm, about 0.5 mm to about 10 mm, about 0.5 mm to about 5 mm, about 0.5 mm to about 3 mm, or about 0.5 mm to about 1 mm in one or more lateral directions.

Additionally, in some embodiments, a grayscale pattern described herein is formed by depositing a first region of support material in a predetermined pattern in the z-direction in addition to or instead of in one or more lateral directions. For example, in some cases, the first region of support material comprises a plurality of selectively deposited sub-regions of support material, wherein the sub-regions are spatially discrete sub-regions distributed between the first and second regions of build material or within the first and second regions of build material. In some instances, the sub-regions are distributed stochastically. Alternatively, in other embodiments, the sub-regions are distributed in an ordered array.

Figure 4:
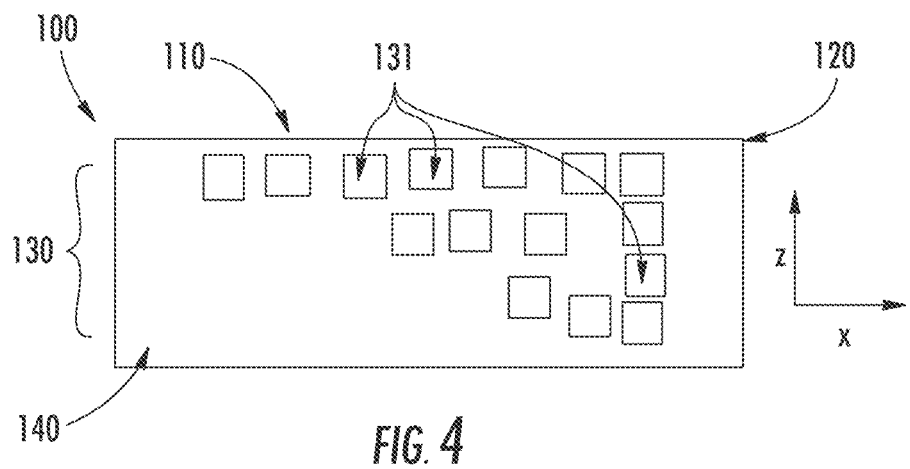
FIG. 4 illustrates schematically a method of providing color values to a 3D article according to one embodiment described herein.

FIG. 4 schematically illustrates a sectional view of one embodiment of a method of forming a grayscale pattern in a manner described above. With reference to FIG. 4, a 3D article (100) comprises an exterior surface (110). The z-direction is orthogonal to the exterior surface (110). A first region of build material (140) and a second region of build material (120) embed a first region of support material (130) disposed in between the first region of build material (140) and the second region of build material (120). The first region of support material (130) comprises a plurality of selectively deposited sub-regions of support material (131). The sub-regions (131) are spatially discrete sub-regions distributed within the first (140) and second (120) regions of build material to form a grayscale pattern on the surface (110). In particular, in the embodiment of FIG. 4, the grayscale pattern comprises a stochastic distribution of spatially discrete sub-regions of support material (131). In other embodiments, a grayscale pattern can comprise an ordered array of spatially-discrete sub-regions of support material. In the embodiment of FIG. 4, the highest lightness values under normal reflectance are observed on the right side of the surface (110), where the thickness of the first region of support material is greatest.

A grayscale pattern described herein, in some embodiments, may also be formed by varying the spatial density and/or weight percent of the first region of support material relative to the surrounding first and second regions of build material. The spatial density and/or weight percent of the first region of support material can be varied in one or more lateral directions and/or in the z-direction. For example, in some cases, a grayscale pattern described herein is formed by depositing the first region of support material in a halftone pattern. In some such embodiments, the halftone pattern is formed from a plurality of selectively deposited dots of the support material. The dots can have any size and/or shape not inconsistent with the objectives of the present disclosure.

Figure 6:
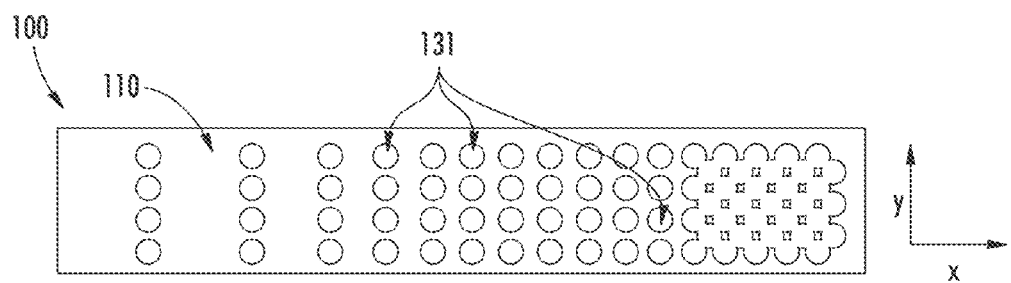
FIG. 6 illustrates schematically a method of providing color values to a 3D article according to one embodiment described herein.

FIG. 6 schematically illustrates a top plan view of one embodiment of a method of forming a grayscale pattern in a manner described above. With reference to FIG. 6, a 3D article (100) comprises an exterior surface (110). As illustrated in FIG. 6, the exterior surface (110) is a substantially planar surface lying in the xy-plane. The z-direction is orthogonal to the exterior surface (110). A first region of support material defines a halftone pattern formed from a plurality of selectively deposited dots of the support material (131). A first region of build material and a second region of build material embed the first region of support material. In the embodiment of FIG. 6, the highest lightness values under normal reflectance are observed on the right side of the surface (110), where the density of dots (131) is highest.

In general, a first region of support material can have any spatial density and/or weight percent relative to surrounding first and second regions of build material not inconsistent with the objectives of the present disclosure. For instance, in some cases, the weight ratio of the first support material to the second region of build material is between about 1:10 and 10:1, between about 1:5 and 5:1, between about 1:3 and 3:1, or between about 1:2 and 2:1. In some instances, the weight ratio is about 1:1. As described in the specific examples hereinbelow, other manners of varying the relative spatial density and/or weight percent of a first region of support material may also be used.

Additionally, in some embodiments described herein, a first region of support material may not form a grayscale pattern in combination with a first and/or second region of build material. Instead, in some cases, a first region of support material described herein can provide a texture or "gloss" to an exterior surface of a 3D article described herein. For example, in some such instances, a method of printing a 3D article comprises selectively depositing a first portion of build material in a fluid state onto a substrate to form a first region of build material; selectively depositing a first portion of support material in a fluid state to form a first region of support material; and selectively depositing a second portion of build material in a fluid state to form a second region of build material, wherein the first region of support material is disposed between the first region of build material and the second region of build material in a z-direction of the article, and wherein the first region of support material forms a texture or gloss pattern in combination with the first region of build material and/or the second region of build material. In some cases, the texture or gloss pattern is formed from a plurality of selectively deposited dots of the support material. The dots can have any size, shape, and/or spatial density not inconsistent with the objectives of the present disclosure. Moreover, in some embodiments, the texture or gloss pattern is formed from an ordered array of selectively deposited dots of support material.

Figure 7:
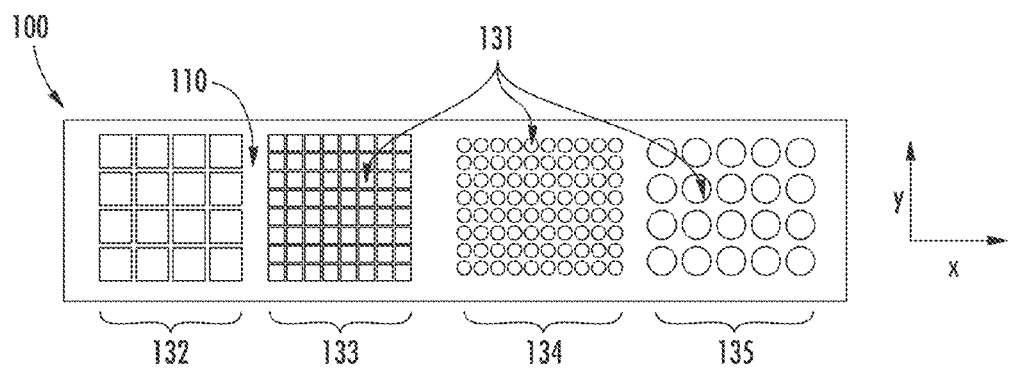
FIG. 7 illustrates schematically a method of providing texture or gloss values to a 3D article according to one embodiment described herein.

FIG. 7 schematically illustrates a top plan view of one embodiment of a method of forming a texture or gloss pattern in a manner described above. With reference to FIG. 7, a 3D article (100) comprises an exterior surface (110). As illustrated in FIG. 7, the exterior surface (110) is a substantially planar surface lying in the xy-plane. The z-direction is orthogonal to the exterior surface (110). A first region of support material forms a plurality of texture or gloss patterns (132, 133, 134, 135) in combination with a first region of build material and/or a second region of build material. Each texture or gloss pattern (132, 133, 134, 135) is formed from a plurality of selectively deposited dots of the support material (131). The dots (131) of the differing texture or gloss patterns (132, 133, 134, 135) have differing sizes, shapes, and/or spatial densities. In the embodiment of FIG. 7, each texture or gloss pattern (132, 133, 134, 135) can provide a different texture or gloss to the surface (110).

It is to be understood that various regions of material described herein can be deposited in any manner not inconsistent with the objectives of the present disclosure. In some embodiments, a method of printing a 3D article described herein comprises depositing one or more materials or regions of material according to an image of the 3D article in a computer readable format, such as a computer assisted design (CAD) format. Further, in some embodiments, a build material and/or support material described herein remains substantially fluid upon deposition. In other embodiments, a build material and/or support material exhibits a phase change upon deposition.

In addition, in some embodiments, a method described herein further comprises curing a first and/or second region of build material described herein. In some cases, curing is carried out by subjecting the build material to electromagnetic radiation of sufficient wavelength and intensity to cure the build material, where curing can comprise polymerizing one or more polymerizable functional groups of one or more components of the build material. For example, in some instances, a build material is cured with ultraviolet (UV) radiation.

Further, in some embodiments, after each layer of a build material and/or support material is deposited to form a portion of a first or second region of build material and/or a portion of a first region of support material, the deposited material is planarized and, optionally, cured prior to the deposition of the next layer. In some cases, several layers can be deposited before planarization and curing, or multiple layers can be deposited and cured followed by one or more layers being deposited and then planarized without curing. Planarization can correct the thickness of one or more layers prior to curing the material by evening the dispensed material to remove excess material and create a uniformly smooth exposed or flat up-facing surface on the support platform or printing substrate of a 3D printing system. In some cases, planarization is accomplished with a wiper device, such as a roller, which may be counter-rotating in one or more printing directions but not counter-rotating in one or more other printing directions. In some embodiments, the wiper device comprises a roller and a wiper that removes excess material from the roller. Additionally, in some cases, the wiper device is heated. It should be noted that the consistency of a jetted build material or support material described herein prior to curing, in some embodiments, can be sufficient to retain its shape and not be subject to excessive viscous drag from the planarizer. The foregoing process can be continued until a finished 3D article is prepared.

Moreover, in some cases, a method described herein further comprises cooling the 3D article to solidify the first region of support material. Such cooling may be carried out, for instance, following the curing of a build material described herein. A 3D article described herein can be cooled quickly or slowly to solidify the first region of support material. Moreover, the rate of cooling of the first region of support material can alter the visual effect provided by the first region of support material. For example, in some embodiments, rapidly cooling and/or solidifying the first region of support material can provide a solid or uniform appearance to the first region of support material. Alternatively, slowly cooling and/or solidifying the first region of support material, in some instances, can provide a porous, variegated, or bubbled appearance to the first region of support material. Therefore, in some embodiments described herein, a 3D article is cooled and/or a first region of support material is solidified at a rate selected to provide a desired visual effect. Any cooling and/or solidification rate not inconsistent with the objectives of the present disclosure may be used. In some cases, a 3D article is cooled at a rate of 1-100° C. per minute, 1-80° C. per minute, 1-50° C. per minute, 1-20° C. per minute, 1-15° C. per minute, 1-10° C. per minute, or 1-5° C. per minute. In other cases, a 3D article is cooled at a rate of 10-100° C. per minute, 10-60° C. per minute, 20-100° C. per minute, 30-100° C. per minute, 50-100° C. per minute, or 60-100° C. per minute. In some embodiments, a 3D article is cooled at a rate slower than 1° C. per minute or greater than 100° C. per minute. In some instances, a 3D article is cooled by 50-100° C., or from a curing or jetting temperature to a temperature of about 20-30° C., in less than 10 seconds, less than 5 seconds, or less than 3 seconds.

It is further to be noted that, in some cases, the rate of cooling of a region of support material and/or the rate or timing of curing of a region of build material can be selected to provide further visual value modification to a printed article. For example, in some instances, adjacent regions or droplets of support material and build material deposited in a manner described herein can be permitted to physically mix with one another prior to solidification or curing of the materials. In this manner, further visual or color effects may be achieved by the mixing of fluid support materials and build materials.

Additionally, a method of printing a 3D article described herein, in some embodiments, further comprises supporting at least a portion of at least one of the first and second regions of build material with one or more second regions of support material. Moreover, in some cases, the first and second regions of support material are formed from the same support material. However, in some instances, the second region of support material supports an external portion of the object and is used in the typical manner of a support material in a 3D printing process. That is, as described herein, the same support material can be used for two distinct purposes in a 3D printing process. Specifically, a support material can first be used to provide a visual effect, value, or pattern through the formation of a first support region and/or grayscale or other colorization pattern described herein. The same support material, in some cases, may also be used to provide support to one or more portions of build material during a 3D printing process. Thus, methods described herein, in some embodiments, can provide more efficient use of materials and/or 3D printing systems to provide printed 3D articles having a desired colorization profile.

It is to be understood that a support material used to support one or more regions of build material may be removed from a 3D article following the completion of printing. Thus, in some cases, a method described herein further comprises removing one or more second regions of support material from the 3D article. A second region of support material may be removed in any manner not inconsistent with the objectives of the present disclosure. In some cases, for instance, a second region of support material is removed by at least partially immersing the 3D article in water, with or without sonication and/or the use of detergents. A support material, in some embodiments, may also be removed by flowing water or another solvent over the 3D article and/or by heating the support material above its melting point. In some cases, a support material may be removed by first heating the 3D article in an oven at a temperature above the melting point of the support material to remove most of the support material, and then subsequently applying a solvent to the cooled 3D article to remove any residual support material from the surface of the 3D article.

As described herein, a method of printing a 3D article can use a support material to provide a visual effect, value, or pattern such as a grayscale pattern on an exterior surface of the 3D article. In addition, it is also possible, in some cases, to provide grayscale printing of a 3D object in a manner described herein by replacing the first region of support material with an additional region of build material. The build material, in some embodiments, is a second build material that differs from the build material used to form the first and/or second regions of build material. Thus, in some cases, a method of printing a 3D article described herein comprises selectively depositing a first portion of a first build material in a fluid state onto a substrate to form a first region of first build material; selectively depositing a second build material in a fluid state to form a first region of second build material; and selectively depositing a third portion of the first build material in a fluid state to form a second region of the first build material, wherein the first and second build materials are differently colored and the first region of second build material forms a grayscale pattern in combination with the first and/or second region of the first build material. Moreover, in some such embodiments, the method can further comprise supporting at least one of the first and second regions of first build material with a support material. Any combination of support material and first and second build materials not inconsistent with the objectives of the present disclosure may be used. In some embodiments, the second build material is a white build material, and the first build material is a non-white build material.

Similarly, it is also possible, in some instances, to provide grayscale printing of a 3D object in a manner described herein by at least partially replacing the first region of support material and/or the second region of build material with a void or space empty of material. Thus, in some cases, a method of printing a 3D article described herein comprises selectively depositing a first portion of a build material in a fluid state onto a substrate to form a first region of build material; selectively forming a first region of voids of material; and selectively depositing a second portion of build material in a fluid state to form a second region of the build material, wherein the first region of voids of material forms a grayscale pattern in combination with the first and/or second region of the build material. Moreover, in some embodiments, a first region of support material is also formed in a manner described herein, and the first region of support material and the first region of voids are adjacent to one another. Thus, in some cases, a visual effect such as a grayscale is provided by incompletely "filling" a first region of support material described herein, and instead leaving some empty space or voids in this first region. It is also possible, in some cases, to provide visual value to a surface of a 3D article in a similar manner by leaving voids or spaces empty of material within or immediately adjacent to a region of build material described herein.

Moreover, it is further to be understood that a method of printing a 3D article described herein is not limited to depositing only three regions of build material and/or support material in a manner described above. Instead, a method described herein can comprise providing a plurality of regions of build material in combination with a plurality of regions of support material to provide a desired grayscale or other visual effect in accordance with a method described herein. For example, in some cases, n or (n+1) regions of support material can be disposed in combination with n or (n+1) regions of build material to provide a grayscale pattern. In some such embodiments, the regions of support material and the regions of build material are arranged in an alternating configuration. Other configurations of a plurality of regions of support material and build material may also be used to provide a grayscale pattern or visual effect described herein.

Turning now to specific materials used in a method of printing a 3D article described herein, a build material used in a method described herein can include any build material not inconsistent with the objectives of the present disclosure. In some cases, a build material described herein comprises a curable material. The curable material can be present in the build material in any amount not inconsistent with the objectives of the present disclosure. In some cases, the curable material is present in an amount up to about 99 weight %, up to about 95 weight %, up to about 90 weight %, or up to about 80 weight %, based on the total weight of the build material. In some cases, a build material described herein comprises about 10-95 weight % curable material, based on the total weight of the build material. In some embodiments, a build material comprises about 20-80 weight % curable material, about 30-70 weight % curable material, or about 70-90 weight % curable material.

Moreover, any curable material not inconsistent with the objectives of the present disclosure may be used. In some cases, a curable material comprises one or more polymerizable components. A "polymerizable component," for reference purposes herein, comprises a component that can be polymerized or cured to provide a printed 3D article or object. Polymerizing or curing can be carried out in any manner not inconsistent with the objectives of the present disclosure. In some embodiments, for instance, polymerizing or curing comprises irradiating with electromagnetic radiation having sufficient energy to initiate a polymerization or cross-linking reaction. For instance, in some cases, ultraviolet (UV) radiation can be used.

Further, any polymerizable component not inconsistent with the objectives of the present disclosure may be used. In some embodiments, a polymerizable component comprises a monomeric chemical species, such as a chemical species having one or more functional groups or moieties that can react with the same or different functional groups or moieties of another monomeric chemical species to form one or more covalent bonds, such as in a polymerization reaction. A polymerization reaction, in some cases, comprises a free radical polymerization, such as that between points of unsaturation, including points of ethylenic unsaturation. In some embodiments, a polymerizable component comprises at least one ethylenically unsaturated moiety, such as a vinyl group or allyl group. In some cases, a polymerizable component comprises an oligomeric chemical species capable of undergoing additional polymerization, such as through one or more points of unsaturation as described herein. In some embodiments, a polymerizable component comprises one or more monomeric chemical species and one or more oligomeric chemical species described herein. A monomeric chemical species and/or an oligomeric chemical species described herein can have one polymerizable moiety or a plurality of polymerizable moieties. For example, in some instances, a polymerizable component comprises one, two, or three ethylenically unsaturated moieties.

Further, in some cases, a polymerizable component comprises one or more photo-polymerizable or photo-curable chemical species. A photo-polymerizable chemical species, in some embodiments, comprises a UV-polymerizable chemical species. In some instances, a polymerizable component is photo-polymerizable or photo-curable at wavelengths ranging from about 300 nm to about 400 nm. Alternatively, in other cases, a polymerizable component is photo-polymerizable at visible wavelengths of the electromagnetic spectrum.

In some embodiments, a polymerizable component described herein comprises one or more species of (meth) acrylates. As used herein, the term "(meth)acrylate" includes acrylate or methacrylate or mixtures or combinations thereof. In some cases, a polymerizable component comprises an aliphatic polyester urethane acrylate oligomer, a urethane (meth)acrylate resin, and/or an acrylate amine oligomeric resin, such as EBECRYL 7100. In some instances, a UV polymerizable or curable resin or oligomer can comprise any methacrylate or acrylate resin which polymerizes in the presence of a free radical photoinitiator, is thermally stable in an exposed state for at least one week at the jetting temperature of the ink and for at least 4 weeks in an enclosed state, and/or has a boiling point greater than the jetting temperature. In some embodiments, a polymerizable component has a flash point above the jetting temperature.

Urethane (meth)acrylates suitable for use in build materials described herein, in some cases, can be prepared in a known manner, typically by reacting a hydroxyl-terminated urethane with acrylic acid or methacrylic acid to give the corresponding urethane (meth)acrylate, or by reacting an isocyanate-terminated prepolymer with hydroxyalkyl acrylates or methacrylates to give the urethane (meth)acrylate. Suitable processes are disclosed, inter alia, in EP-A 114 982 and EP-A 133 908. The weight average molecular weight of such (meth)acrylate oligomers, in some cases, can be from about 400 to 10,000 or from about 500 to 7,000. Urethane (meth)acrylates are also commercially available from the SARTOMER Company under the product names CN980, CN981, CN975 and CN2901, or from Bomar Specialties Co. (Winsted, Conn.) under the product name BR-741. In some embodiments described herein, a urethane (meth)acrylate oligomer has a viscosity ranging from about 140,000 centipoise (cP) to about 160,000 cP at about 50° C. or from about 125,000 cP to about 175,000 cP at about 50° C. when measured in a manner consistent with ASTM D2983. In some cases described herein, a urethane (meth)acrylate oligomer has a viscosity ranging from about 100,000 cP to about 200,000 cP at about 50° C. or from about 10,000 cP to about 300,000 cP at about 50° C. when measured in a manner consistent with ASTM D2983.

In addition, in some cases, a polymerizable component comprises one or more low molecular weight materials, such as (meth)acrylates, di(meth)acrylates, and tri(meth)acrylates, which can be used in a variety of combinations. In some embodiments, for example, a polymerizable component comprises one or more of tetrahydrofurfuryl methacrylate, triethylene glycol dimethacrylate, 2-phenoxyethyl methacrylate, lauryl methacrylate, ethoxylated trimethylolpropane triacrylate, tricyclodecane dimethanol diacrylate, 2-phenoxyethylacrylate, triethylene glycol diacrylate, a monofunctional aliphatic urethane acrylate, polypropylene glycol monomethacrylate, polyethylene glycol monomethacrylate, cyclohexane dimethanol diacrylate, and tridecyl methacrylate.

Further, in some embodiments, a polymerizable component comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, polyethylene glycol, tripropylene glycol, ethoxylated or propoxylated neopentyl glycol, 1,4-dihydroxymethylcyclohexane, 2,2-bis (4-hydroxycyclohexyl)propane or bis(4-hydroxycyclohexyl)methane, hydroquinone, 4,4'-dihydroxybiphenyl, bisphenol A, bisphenol F, bisphenol S, ethoxylated or propoxylated bisphenol A, ethoxylated or propoxylated bisphenol F or ethoxylated or propoxylated bisphenol S.

As described hereinabove, a polymerizable component, in some cases, comprises one or more tri(meth)acrylates. In some embodiments, tri(meth)acrylates comprise 1,1-trimethylolpropane triacrylate or methacrylate, ethoxylated or propoxylated 1,1,1-trimethylolpropanetriacrylate or methacrylate, ethoxylated or propoxylated glycerol triacrylate, pentaerythritol monohydroxy triacrylate or methacrylate, or tris(2-hydroxy ethyl) isocyanurate triacrylate.

In some embodiments, a polymerizable component of a build material described herein comprises one or more higher functional acrylates or methacrylates such as dipentaerythritol monohydroxy pentaacrylate or bis(trimethylolpropane) tetraacrylate. In some embodiments, a (meth) acrylate of a build material described herein has a molecular weight ranging from about 250 to 700.

In some cases, a polymerizable component comprises allyl acrylate, allyl methacrylate, methyl(meth)acrylate, ethyl(meth)acrylate, n-propyl(meth)acrylate, n-butyl(meth) acrylate, isobutyl(meth)acrylate, n-hexyl(meth)acrylate, 2-ethylhexyl(meth)acrylate, n-octyl(meth)acrylate, n-decyl (meth)acrylate and n-dodecyl(meth)acrylate, 2-hydroxyethyl(meth)acrylate, 2- and 3-hydroxypropyl(meth)acrylate, 2-methoxyethyl(meth)acrylate, 2-ethoxyethyl(meth)acrylate, 2- or 3-ethoxypropyl(meth)acrylate, tetrahydrofurfuryl methacrylate, 2-(2-ethoxyethoxyl)ethyl acrylate, cyclohexyl methacrylate, 2-phenoxyethyl acrylate, glycidyl acrylate, isodecyl acrylate, or a combination thereof.

Additional non-limiting examples of species of polymerizable components useful in some embodiments described herein include the following: isobornyl acrylate (IBOA), commercially available from SARTOMER under the trade name SR 506A; isobornyl methacrylate, commercially available from SARTOMER under the trade name SR 423A; triethylene glycol diacrylate, commercially available from SARTOMER under the trade name SR 272; and triethylene glycol dimethacrylate, commercially available from SARTOMER under the trade name SR 205.

A build material described herein can also comprise a colorant. The colorant of a build material described herein can be a particulate colorant, such as a particulate pigment, or a molecular colorant, such as a molecular dye. Any such particulate or molecular colorant not inconsistent with the objectives of the present disclosure may be used. In some cases, for instance, the colorant of a build material comprises an inorganic pigment, such as $TiO_2$ and/or ZnO.

In addition, build materials described herein, in some embodiments, further comprise one or more additives. In some embodiments, a build material described herein further comprises one or more additives selected from the group consisting of photoinitiators, inhibitors, stabilizing agents, sensitizers, and combinations thereof. For example, in some cases, a build material further comprises one or more photoinitiators. Any photoinitiator not inconsistent with the objectives of the present disclosure can be used. In some embodiments, a photoinitiator comprises an alpha-cleavage type (unimolecular decomposition process) photoinitiator or a hydrogen abstraction photosensitizer-tertiary amine synergist, operable to absorb light preferably between about 250 nm and about 400 nm or between about 300 nm and about 385 nm, to yield free radical(s).

Examples of alpha cleavage photoinitiators are Irgacure 184 (CAS 947-19-3), Irgacure 369 (CAS 119313-12-1), and Irgacure 819 (CAS 162881-26-7). An example of a photosensitizer-amine combination is Darocur BP (CAS 119-61-9) with diethylaminoethylmethacrylate.

In addition, in some instances, suitable photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, for example 2,4,6-trimethylbenzoyldiphenylphosphine oxide (Lucirin TPO), benzophenones, such as benzophenone and 4,4'-bis(N,N'-dimethylamino)benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

Suitable photoinitiators can also comprise those operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Additionally, in some cases, suitable photoinitiators comprise those operable for use with an Ar laser radiation source including benzil ketals, such as benzil dimethyl ketal. In some embodiments, a photoinitiator comprises an α-hydroxyphenyl ketone, benzil dimethyl ketal or 2,4,6-trimethylbenzoyldiphenylphosphine oxide or a mixture thereof.

Another class of suitable photoinitiators, in some instances, comprises ionic dye-counter ion compounds capable of absorbing actinic radiation and generating free radicals for polymerization initiation. In some embodiments, inks containing ionic dye-counter ion compounds can be cured more variably with visible light within the adjustable wavelength range of about 400 nm to about 700 nm. Ionic dye-counter ion compounds and their mode of operation are disclosed in EP-A-0 223 587 and U.S. Pat. Nos. 4,751,102; 4,772,530; and 4,772,541.

A photoinitiator can be present in a build material described herein in any amount not inconsistent with the objectives of the present disclosure. In some embodiments, a photoinitiator is present in a build material in an amount of up to about 5 weight %, based on the total weight of the build material. In some cases, a photoinitiator is present in an amount ranging from about 0.1 weight % to about 5 weight %.

Moreover, in some embodiments, a build material described herein further comprises one or more sensitizers. A sensitizer can be added to a build material to increase the effectiveness of one or more photoinitiators that may also be present. Any sensitizer not inconsistent with the objectives of the present disclosure may be used. In some cases, a sensitizer comprises isopropylthioxanthone (ITX) or 2-chlorothioxanthone (CTX).

A sensitizer can be present in a build material in any amount not inconsistent with the objectives of the present disclosure. In some embodiments, a sensitizer is present in an amount ranging from about 0.1 weight % to about 2 weight % or from about 0.5 weight % to about 1 weight %, based on the total weight of the build material.

In addition, a build material described herein, in some embodiments, further comprises one or more polymerization inhibitors or stabilizing agents. A polymerization inhibitor can be added to a build material to provide additional thermal stability to the composition. Any polymerization inhibitor not inconsistent with the objectives of the present disclosure may be used. In some cases, a polymerization inhibitor comprises methoxyhydroquinone (MEHQ). A stabilizing agent, in some embodiments, comprises one or more anti-oxidants. A stabilizing agent can comprise any anti-oxidant not inconsistent with the objectives of the present disclosure. In some cases, suitable anti-oxidants include various aryl compounds, including butylated hydroxytoluene (BHT), which can also be used as a polymerization inhibitor in some embodiments described herein.

A polymerization inhibitor and/or a stabilizing agent can be present in a build material in any amount not inconsistent with the objectives of the present disclosure. In some embodiments, a polymerization inhibitor is present in an amount ranging from about 0.1 weight % to about 2 weight % or from about 0.5 weight % to about 1 weight %. Similarly, in some cases, a stabilizing agent is present in a build material in an amount ranging from about 0.1 weight % to about 5 weight %, from about 0.5 weight % to about 4 weight %, or from about 1 weight % to about 3 weight %, based on the total weight of the build material.

Build materials described herein can exhibit a variety of desirable properties, in addition to those described hereinabove, both before and after curing. A build material in a cured state, in some embodiments, comprises a build material that includes a curable material or polymerizable component that has been at least partially polymerized and/or cross-linked. For instance, in some cases, a cured build material is at least about 10% polymerized or cross-linked or at least about 30% polymerized or cross-linked. In some embodiments, a cured build material is at least about 50%, at least about 70%, at least about 80%, or at least about 90% polymerized or cross-linked. In some instances, a cured build material is between about 10% and about 99% polymerized or cross-linked.

Additionally, a cured build material described herein, in some cases, has an elongation at break of about 5% to about 40%, about 5% to about 25%, or about 5% to about 20%, when measured according to ASTM D638. Further, a cured build material described herein, in some instances, can have a tensile strength of about 35-55 MPa or about 40-50 MPa, when measured according to ASTM D638. In some embodiments, a cured build material has a tensile modulus of about 1300-2800 MPa or about 1500-2500 MPa, when measured according to ASTM D638. Moreover, in some cases, a build material described herein, when cured, can exhibit a plurality of the foregoing properties.

Build materials described herein can be produced in any manner not inconsistent with the objectives of the present disclosure. In some embodiments, for instance, a method for the preparation of a build material described herein comprises the steps of mixing the components of the build material, melting the mixture, and filtering the molten mixture. Melting the mixture, in some cases, is carried out at a temperature of about 75° C. or in a range from about 75° C. to about 85° C. In some embodiments, a build material described herein is produced by placing all components of the build material in a reaction vessel and heating the resulting mixture to a temperature ranging from about 75° C. to about 85° C. with stirring. The heating and stirring are continued until the mixture attains a substantially homogenized molten state. In general, the molten mixture can be filtered while in a flowable state to remove any large undesirable particles that may interfere with jetting or extrusion. The filtered mixture can then be cooled to ambient temperatures and stored until ready for use in a 3D printing system.

A support material used in a method of printing a 3D article described herein can comprise any support material not inconsistent with the objectives of the present disclosure. In some cases, the support material is a white support material. In other instances, as described further hereinbelow, the support material is a non-white support material. Further, in some embodiments, the support material comprises a phase change wax component. A phase change wax component, in some embodiments, is operable to assist or accelerate the solidification of the support material when the support material is cooled to or below the freezing point of the material. In some cases, a phase change wax component has a sharp freezing point or a freezing point over a narrow range of temperatures. In some embodiments, for example, a phase change wax component freezes or solidifies over a temperature range of about 1° C. to about 5° C. or about 1° C. to about 3° C. In some cases, a phase change wax component having a sharp freezing point freezes or solidifies over a temperature range of X±0.5° C., where X is the temperature at which the freezing point is centered (e.g., X=45° C.).

Any phase change wax component not inconsistent with the objectives of the present disclosure may be used in a support material described herein. In some embodiments, a phase change wax component of a support material described herein comprises a ketone wax, an ester wax, an alcohol wax, an amide wax, a urethane wax, or a mixture or combination thereof.

A ketone wax, in some cases, comprises an alkyl alkyl ketone, an alkyl aryl ketone, an aryl aryl ketone, an aryl arylalkyl ketone, an aryl alkylaryl ketone, an arylalkyl arylalkyl ketone, an arylalkyl alkylaryl ketone, an alkylaryl alkylaryl ketone, or a combination or mixture of two or more of the foregoing. For example, in some embodiments, a ketone wax of a phase change wax component described herein comprises an alkyl alkyl ketone having the general formula R—(C=O)—R', wherein R and R' are each independently an alkyl group having between 1 and 36 carbon atoms, provided that at least one of R and R' is an alkyl group having at least 4 carbon atoms. In some cases, such an alkyl group is linear. An alkyl group of a ketone wax described herein can also be branched, cyclic, saturated, unsaturated, substituted, or unsubstituted. Non-limiting examples of alkyl alkyl ketones suitable for use in some embodiments of support materials described herein include n-octyl-n-propyl ketone; n-octyl-n-butyl ketone, n-decyl-n-ethyl ketone, n-undecyl-n-propyl ketone, n-dodecyl-n-ethyl ketone, di-n-hexylketone, di-n-heptylketone, di-n-octyl ketone, di-n-nonyl ketone, di-n-decyl ketone, di-n-undecyl ketone, di-n-tridecyl ketone, di-n-heptadecyl ketone, di-n-octadecyl ketone, and mixtures or combinations thereof. Other alkyl alkyl ketones may also be used.

Further, a ketone wax of a phase change wax component described herein can also comprise an alkyl aryl ketone having the general formula R—(C=O)—Ar, wherein R is an alkyl group as described above for an alkyl alkyl ketone, and Ar is an aryl group having 6 to 36 carbon atoms. The aryl group, in some cases, comprises a substituted or unsubstituted phenyl, naphthyl, or anthryl group. Non-limiting examples of alkyl aryl ketones suitable for use in some embodiments of support materials described herein include n-octyl phenyl ketone, n-undecyl phenyl ketone, n-pentadecyl phenyl ketone, n-octadecyl phenyl ketone, and mixtures or combinations thereof. Other alkyl aryl ketones may also be used.

In addition, in some embodiments, a ketone wax of a phase change wax component described herein comprises an aryl aryl ketone having the general formula Ar—(C=O)—Ar', wherein Ar and Ar' are each independently an aryl group described above for alkyl aryl ketones. Non-limiting examples of aryl aryl ketones suitable for use in some embodiments of support materials described herein include diphenyl acetone, 2-naphthyl phenyl ketone, and mixtures or combinations thereof. Other aryl aryl ketones may also be used.

Moreover, a ketone wax of a phase change wax component described herein can also comprise an aryl arylalkyl ketone or an aryl alkylaryl ketone having the general formula Ar—(C=O)—Ar'R or Ar—(C=O)—RAr', wherein R is an alkyl group described hereinabove for an alkyl alkyl ketone, and Ar and Ar' are each independently an aryl group described hereinabove for an aryl aryl ketone. One non-limiting example of an aryl alkylaryl ketone suitable for use in some embodiments of support materials described herein is benzyl phenyl ketone. Other aryl arylalkyl ketones or aryl alkylaryl ketones may also be used.

In addition, in some embodiments, a ketone wax of a phase change wax component described herein comprises an arylalkyl arylalkyl ketone, an arylalkyl alkylaryl ketone, or an alkylaryl alkylaryl ketone having the general formula RAr—(C=O)—Ar'R, RAr—(C=O)—R'Ar', or ArR—

(C=O)—R'Ar', wherein Ar and Ar' are each independently an aryl group described above and R and R' are each independently an alkyl group described above. One non-limiting example of such a ketone is di-n-benzyl ketone. Other such ketones may also be used.

Moreover, when a ketone wax described herein comprises a substituted alkyl, aryl, alkylaryl, or arylalkyl group, one or more substituents of the substituted group, in some cases, can comprise a hydroxy group, amine group, imine group, ammonium group, pyridine group, pyridinium group, ether group, ester group, amide group, carbonyl group, thiocarbonyl group, sulfate group, sulfonate group, sulfide group, sulfoxide group, phosphine group, phosphonium group, phosphate group, mercapto group, nitroso group, sulfone group, acyl group, acid anhydride group, or azide group.

Additional examples of ketone waxes suitable for use in some embodiments of support materials described herein include stearones such as T-1 (Kao Corporation); KLB-766 (C21-(C=O)—C21 ketone) (Kao Corporation); and KLB-770 (C17-(C=O)—C17 ketone) (Kao Corporation), and/or laurones such as LAURONE (Kanto Kagaku Co. Ltd.).

An ester wax, in some embodiments, comprises an alkyl alkyl ester, an alkyl aryl ester, an aryl aryl ester, an aryl arylalkyl ester, an aryl alkylaryl ester, an arylalkyl arylalkyl ester, an arylalkyl alkylaryl ester, an alkylaryl alkylaryl ester, or a combination or mixture of two or more of the foregoing. For example, in some cases, an ester wax of a phase change wax component described herein comprises an ester having the general formula R—(C=O)—OR', wherein R and R' are each independently an alkyl group described hereinabove for ketone waxes, such as an alkyl group having between 1 and 36 carbon atoms, provided that at least one of R and R' is an alkyl group having at least 4 carbon atoms. In some cases, such an alkyl group is linear. An alkyl group of an ester wax described herein can also be branched, cyclic, saturated, unsaturated, substituted, or unsubstituted. An ester wax can also have the general formula R—(C=O)—OAr, RO—(C=O)—Ar, Ar—(C=O)—OAr', ArO—(C=O)—RAr', Ar—(C=O)—ORAr', ArO—(C=O)—Ar'R, Ar—(C=O)—OAr'R, ArR—(C=O)—OAr'R, ArR—(C=O)—OR'Ar', or RAr—(C=O)—OR'Ar', wherein Ar and Ar' are each independently an aryl group described above and R and R' are each independently an alkyl group described above. For example, in some embodiments, Ar and Ar' are each an aryl group having 6 to 36 carbon atoms. One non-limiting example of an ester wax suitable for use in some embodiments described herein is methyl behenate ($CH_3O—(C=O)—CH_2(CH_2)_{20}CH_3$). Other ester waxes may also be used.

Moreover, when an ester wax described herein comprises a substituted alkyl, aryl, alkylaryl, or arylalkyl group, one or more substituents of the substituted group, in some cases, can comprise a substituent group described hereinabove for substituted ketone waxes.

An alcohol wax, in some instances, comprises a fatty alcohol. Any fatty alcohol not inconsistent with the objectives of the present disclosure may be used. In some cases, a fatty alcohol has the general formula $C_nH_{2n+1}OH$, wherein n is an integer from 6 to 36 or from 8 to 28. In some embodiments, for example, a fatty alcohol comprises decanol ($C_{10}H_{21}OH$), dodecanol ($C_{12}H_{25}OH$), tetradecanol ($C_{14}H_{29}OH$), hexadecanol ($C_{16}H_{33}OH$), octadecanol ($C_{18}H_{37}OH$), eicosanol ($C_{20}H_{41}OH$) or docosanol ($C_{22}H_{45}OH$), or a mixture or combination thereof. Further, a fatty alcohol described herein, in some cases, can be a primary alcohol such as stearyl alcohol or behenyl alcohol. Other fatty alcohols may also be used.

Further, an alcohol wax described herein can also comprise a synthetic long chain alcohol or a hydroxyl-terminated hydrophobic polymer, such as a hydroxyl-terminated polyethylene. For example, in some cases, an alcohol wax described herein comprises UNILIN 350, UNILIN 425, UNILIN 550, and/or UNILIN 700.

An amide wax, in some embodiments, comprises an alkyl alkyl amide or bis(amide), an alkyl aryl amide or bis(amide), an aryl aryl amide or bis(amide), an aryl arylalkyl amide or bis(amide), an aryl alkylaryl amide or bis(amide), an arylalkyl arylalkyl amide or bis(amide), an arylalkyl alkylaryl amide or bis(amide), an alkylaryl alkylaryl amide or bis(amide), or a combination or mixture of two or more of the foregoing. For example, in some cases, an amide wax of a phase change wax component described herein comprises ethylene bis(stearamide) (EBS). In other cases, an amide has the general formula R—(C=O)—NHR', wherein R and R' are each independently an alkyl group described hereinabove, such as an alkyl group having between 1 and 36 carbon atoms, provided that at least one of R and R' is an alkyl group having at least 4 carbon atoms. In some cases, such an alkyl group is linear. An alkyl group of an amide wax described herein can also be branched, cyclic, saturated, unsaturated, substituted, or unsubstituted. An amide wax can also have the general formula R—(C=O)—NR"Ar, RNR"—(C=O)—Ar, Ar—(C=O)—NR"Ar', ArNR"—(C=O)—RAr', Ar—(C=O)—NR"RAr', ArNR"—(C=O)—Ar'R, Ar—(C=O)—NR"Ar'R, ArR—(C=O)—NR"Ar'R, ArR—(C=O)—NR"R'Ar', or RAr—(C=O)—NR"R'Ar', wherein Ar and Ar' are each independently an aryl group described above, R and R' are each independently an alkyl group described above, and R" is hydrogen or an alkyl group described above. For example, in some embodiments, Ar and Ar' are each an aryl group having 6 to 36 carbon atoms. One non-limiting example of an amide wax suitable for use in some embodiments described herein is stearyl stearamide ($CH_3(CH_2)_{17}—(C=O)—NH(CH_2)_{17}CH_3$). Other amide waxes may also be used.

A urethane wax, in some embodiments, is selected from a class of inert linear urethane waxes having the general chemical formula $C_{18}H_{37}NRCOOC_xH_{(2x+1)}$ wherein x is an integer from 4 to 16, and R is H or C1-C20 alkyl. In some cases, R is H. In some embodiments, R is C1-C6 alkyl, C1-C10 alkyl, or C1-C20 alkyl. Alternatively, in other cases, a urethane wax is selected from a class of reactive linear urethane waxes having the formula $C_xH_{(2x+1)}NRC(O)OC_yH_{2y}OC(O)C(CH_3)=CH_2$ wherein x is an integer from 12 to 18, y is an integer from 2 to 12, and R is H or C1-C20 alkyl. In some embodiments, R is H. In other cases, R is C1-C6 alkyl, C1-C10 alkyl, or C1-C20 alkyl. Non-limiting examples of urethane waxes suitable for use in some embodiments of support materials described herein include 1-dodecyl-N-octadecyl carbamate ($CH_3(CH_2)_{17}NHCOO(CH_2)_{11}CH_3$) and 1-hexadecyl-N-octadecyl carbamate ($CH_3(CH_2)_{17}NHCOO(CH_2)_{15}CH_3$). Other urethane waxes may also be used.

Support materials described herein may also comprise one or more components in addition to a phase change wax component. For example, in some cases, a support material comprises an ethoxylated polyethylene, such as an ethoxylated polyethylene having the formula H—$(CH_2)_m$—$(OCH_2CH_2)_n$—OH, wherein m is an integer from 10 to 60 and n is an integer from 2 to 200.

Further, in some embodiments, a support material described herein can comprise a colorant. The colorant can be a particulate colorant, such as a particulate pigment, or a molecular colorant, such as a molecular dye. Any such particulate or molecular colorant not inconsistent with the objectives of the present disclosure may be used. In some cases, a support material comprising such a colorant can be a non-white support material, which may be used in combination with a variety of build materials described herein to provide a desired visual effect or colorization pattern.

II. Methods of Printing a 3D Article Comprising a Full-Color Pattern

In another aspect, methods of printing 3D articles comprising a full-color pattern are described herein. In some embodiments, a method of printing a 3D article comprises selectively depositing a first portion of build material in a fluid state onto a substrate to form a first region of build material; selectively depositing a first portion of support material in a fluid state to form a first region of support material; and selectively depositing a second portion of build material in a fluid state to form a second region of build material, wherein the first region of support material is disposed between the first region of build material and the second region of build material in a z-direction of the article. In addition, the first and/or second region of build material is formed from a mixture or combination of one or more of a first build material having a cyan color, a second build material having a magenta color, and a third build material having a yellow color under ordinary illumination by visible white light. Further, the first region of support material is formed from a support material having a white color under ordinary illumination by visible white light.

In some such cases, the first region of support material can act as a white or reflective substrate for an additive or subtractive CMY colorization scheme or model. Thus, in some embodiments, the first region of support material forms a CMY color pattern in combination with the first region of build material and/or the second region of build material. The CMY color pattern can be a two-dimensional pattern formed on an exterior surface of the article or a three-dimensional pattern visible through an exterior surface of the article. Moreover, a CMY color pattern described herein, in some cases, can be provided by normal reflection of light incident on the surface of the article. Alternatively, in other instances, a CMY color pattern can be provided by "backlighting" the surface or article, including by passing light through the article from a side opposite or otherwise different from an exterior surface described herein. Further, a "CMY color pattern," in some cases, comprises a pattern that is perceived by the ordinary human eye as a color pattern in the CMY color gamut. Thus, a method described herein can be used to provide a full-color or substantially full-color printed article.

Moreover, a method described herein, in some cases, can be used to print 3D articles having full-color CMY coloration using a print head having only four channels. For example, in some instances, the first and second portions of the build material are deposited from first, second, and third channels of a print head of a three-dimensional printing system, and the support material is deposited from a fourth channel of the print head. In some cases, the print head comprises an ink jet print head, such as a four-channel ink jet print head. Moreover, in some instances, the first channel is a cyan build material channel, the second channel is a magenta build material channel, the third channel is a yellow build material channel, and the fourth channel is a white support material channel.

In addition, in some embodiments of a method described herein, the first region of support material is completely or substantially completely covered by the second region of build material in a z-direction, including in a manner described hereinabove in Section I. Further, in some cases, the first and/or second portion of build material is optically transparent or substantially optically transparent.

Various CMY color patterns can be provided according to a method described herein. Moreover, in some embodiments, a CMY color pattern is formed in a manner analogous to a grayscale pattern described hereinabove in Section I. For instance, in some cases, a CMY color pattern is formed by varying the thickness of the first region of support material and/or the thickness of the second region of build material in one or more lateral directions, as described hereinabove.

Figure 3:
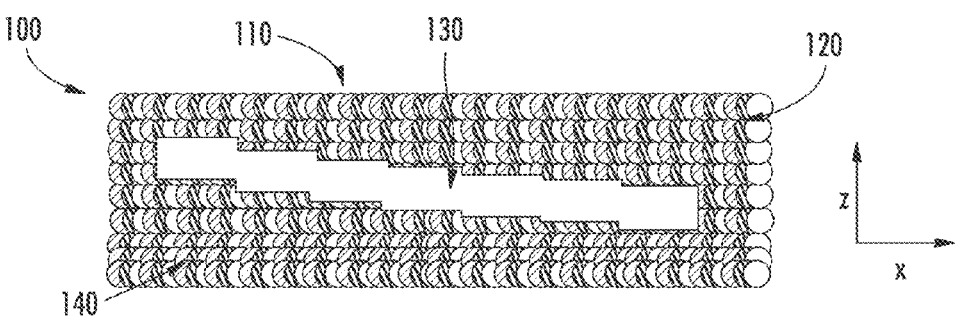
FIG. 3 illustrates schematically a method of providing color values to a 3D article according to one embodiment described herein.

FIG. 3 schematically illustrates a sectional view of one such embodiment of a method described herein. With reference to FIG. 3, a 3D article (100) comprises an exterior surface (110). The z-direction is orthogonal to the exterior surface (110). A first region of build material (140) and a second region of build material (120) embed a first region of support material (130) disposed in between the first region of build material (140) and the second region of build material (120). In the embodiment of FIG. 3, the thickness of the second region of build material (120) varies in a lateral direction (x) orthogonal to the z-direction, but the thickness of the first region of support material (130) is constant or substantially constant in the lateral direction (x). As illustrated in FIG. 3, the lightest colors would be formed where the first region of support material was closest to the surface (110). Darker colors can be made by increasing the thickness of the second region of build material (120). As depicted in FIG. 3, the colors would be shades of gray/black due to the combination of CMY colors shown. However, it is to be understood that other colors can be formed by changing the ratio of the CMY voxels in the first and/or second regions of build material.

In other cases, a CMY color pattern is formed by depositing the first region of support material in a predetermined pattern in the z-direction and/or in one or more lateral directions. For example, in some embodiments, the first region of support material comprises a plurality of selectively deposited sub-regions of support material, wherein the sub-regions are spatially discrete sub-regions distributed between the first and second build material regions or within the first and second regions of build material to define the CMY color pattern. In some instances, the sub-regions are distributed stochastically. Alternatively, in other embodiments, the sub-regions are distributed in an ordered array.

Figure 5:
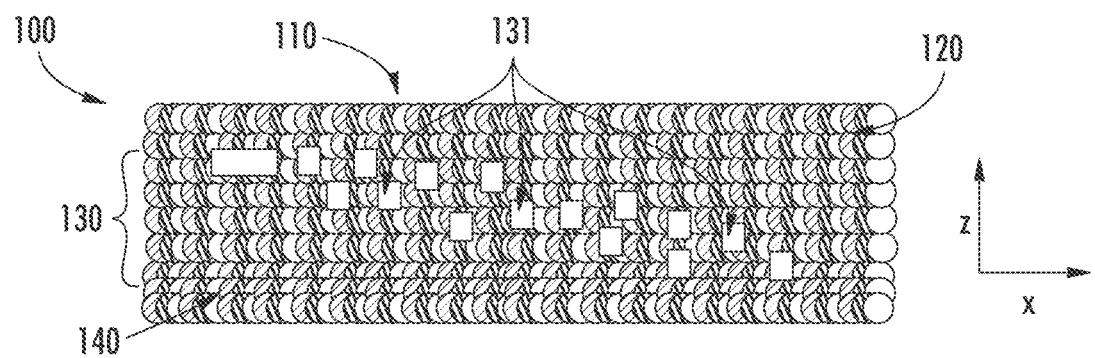
FIG. 5 illustrates schematically a method of providing color values to a 3D article according to one embodiment described herein.

FIG. 5 schematically illustrates a sectional view of one embodiment of a method of forming a CMY color pattern in a manner described above. With reference to FIG. 5, a 3D article (100) comprises an exterior surface (110). The z-direction is orthogonal to the exterior surface (110). A first region of build material (140) and a second region of build material (120) embed a first region of support material (130) disposed in between the first region of build material (140) and the second region of build material (120). The first region of support material (130) comprises a plurality of selectively deposited sub-regions of support material (131). The sub-regions (131) are spatially discrete sub-regions distributed within the first (140) and second (120) regions of build material to form a CMY color pattern on the surface (110). In particular, in the embodiment of FIG. 5, the CMY color pattern comprises a stochastic distribution of spatially discrete sub-regions of support material (131). In other embodiments, a CMY color pattern can comprise an ordered array of spatially-discrete sub-regions of support material.

A CMY color pattern described herein, in some embodiments, may also be formed by varying the spatial density and/or weight percent of the first region of support material relative to the surrounding first and second regions of build material. The spatial density and/or weight percent of the first region of support material can be varied in one or more lateral directions and/or in the z-direction, as described hereinabove in Section I for the formation of a grayscale pattern. For example, in some cases, a CMY color pattern is formed by depositing the first region of support material in a halftone pattern, including a halftone pattern described hereinabove in Section I. In some instances, such a halftone pattern is formed from a plurality of selectively deposited dots of the support material.

Additionally, in some embodiments, the first region of support material may provide a texture or "gloss" to an exterior surface of a 3D article, as described hereinabove in Section I.

Further, a method of printing a CMY colorized 3D article described herein may also comprise any additional steps or features described hereinabove for a grayscale 3D article. For example, in some cases, one or more of the first and second regions of build material and the first region of support material is deposited according to an image of the 3D article in a computer readable format, such as a CAD format. Additionally, in some embodiments, a method described herein further comprises curing the first and/or second region of build material. Moreover, in some instances, a method can also include cooling the 3D article to solidify the first region of support material, such as in a manner described hereinabove in Section I. Additionally, in some embodiments, a method described here further comprises supporting at least a portion of at least one of the first and second regions of build material with one or more second regions of support material. Moreover, in some cases, the first and second regions of support material can be formed from the same support material. In addition, a method described herein, in some embodiments, further comprises removing the one or more second regions of support material from the 3D article, including in a manner described hereinabove in Section I.

Moreover, it is also possible use a support material, such as a white support material, to improve the color resolution of a 3D article and/or to reduce the "bleed" or diffusion of colored droplets of build material. For example, in some embodiments, a method of printing a 3D article described herein comprises selectively depositing a plurality of droplets of a first build material in a fluid state onto a substrate, the first build material comprising one or more colorants; and selectively depositing a support material around one or more of the plurality of droplets of the first build material. In some cases, the support material is in direct contact with one or more of the plurality of droplets of the first build material. Further, in some instances, the support material has a higher viscosity than the build material when the support material is in contact with the one or more plurality of droplets of the build material. In this manner, a support material can be used to "dam" or "encapsulate" a fluid build material prior to completion of curing of the build material, thereby reducing color-to-color diffusion or bleed between adjacent voxels of differing colors.

Any combination of build materials and support materials may be used in a method described herein. For example, in some cases, the build material comprises a curable build material and the support material comprises a non-curable phase change support material. In addition, in some embodiments, the support material is white and the build material is non-white. A non-white support material may also be used. Other combinations are also possible.

III. Printed 3D Articles Comprising a Grayscale Pattern

In another aspect, printed 3D articles are described herein. Such 3D articles, in some cases, can be formed by a method described hereinabove. Any method described hereinabove may be used to provide a 3D printed article described herein. For example, in some embodiments, printed 3D articles comprising a grayscale pattern are described herein. In some embodiments, such a printed 3D article comprises a first region of build material; a first region of support material; and a second region of build material, wherein the first region of support material is disposed between the first region of build material and the second region of build material in a z-direction of the article, and wherein the first region of support material forms a grayscale pattern in combination with the first region of build material and/or the second region of build material. In some cases, the grayscale pattern is a two-dimensional pattern formed on an exterior surface of the article or a three-dimensional pattern visible through an exterior surface of the article. Additionally, in some embodiments, an article described herein has a first grayscale pattern provided by normal reflection of incident light and a second grayscale pattern provided by backlighting the article. Such patterns, in some cases, may be provided by varying the thickness of both the first region of support material and the second region of build material in one or more lateral directions, as described further herein. Such a structure, in some instances, can provide anti-counterfeiting features to an article described herein. For example, in some cases, an anti-counterfeiting message can be revealed by backlighting the article to reveal the second grayscale pattern.

Moreover, in some embodiments, the first region of support material forms a grayscale pattern in combination with the first region of build material. In other cases, the first region of support material forms a grayscale pattern in combination with the second region of build material. Further, the first region of support material can also form a grayscale pattern in combination with both the first and second regions of build material. Additionally, in some cases, the first region of support material is completely or substantially completely covered by the second region of build material in a z-direction, including in a manner described hereinabove in Section I.

Further, in some embodiments, an article described herein does not necessarily comprise the second region of build material. Instead, in some such cases, the first region of support material can form a grayscale pattern in combination with the first region of build material, and the first region of support material can define an exterior surface of the article.

In some cases, the first and/or second portion of build material described herein comprises a colorant. For instances, in some embodiments, the first portion of build material comprises one or more first colorants and the second portion of build material comprises one or more second colorants. In such cases, the first and second colorants can be the same or different from one another. In general, any combination of first and second colorants not inconsistent with the objectives of the present disclosure may be used. Moreover, in some embodiments, the first and second regions of build material are formed from the same build material or combination of build materials.

Further, in some cases, the first and/or second portion of build material of an article described herein is optically transparent or substantially optically transparent. Moreover, in some embodiments, the support material of an article described herein is white. In other instances, the support material is non-white.

An article having a structure described herein can exhibit various grayscale coloration patterns, as described hereinabove in Section I. For example, in some cases, the grayscale pattern of an article described herein is formed by a variation of the thickness of the first region of support material and/or the thickness of the second region of build material in one or more lateral directions. In other cases, the grayscale pattern of an article comprises a stochastic distribution of spatially discrete sub-regions of support material. In some embodiments, the grayscale pattern comprises an ordered array of spatially-discrete sub-regions of support material. Similarly, in some cases, the grayscale pattern of an article is formed by a variation of the spatial density and/or weight percent of the first region of support material relative to the surrounding first and second regions of build material in one or more lateral directions. For example, in some instances, the grayscale pattern comprises a halftone pattern formed from a plurality of dots of the support material.

Further, in some embodiments, the first region of support material may not form a grayscale pattern in combination with the first and/or second region of build material. Instead, in some cases, a first region of support material described herein can provide a texture or gloss to an exterior surface of a 3D article described herein. For example, in some such instances, a printed 3D article comprises a first region of build material; a first region of support material; and a second region of build material, wherein the first region of support material is disposed between the first region of build material and the second region of build material in a z-direction of the article, and wherein the first region of support material forms a texture or gloss pattern in combination with the first region of build material and/or the second region of build material. In some cases, the texture or gloss pattern is formed from a plurality of selectively deposited dots of the support material. The dots can have any size, shape, and/or spatial density not inconsistent with the objectives of the present disclosure. Moreover, in some embodiments, the texture or gloss pattern is formed from an ordered array of selectively deposited dots of support material.

In addition, an article described herein, in some cases, further comprises one or more second regions of support material supporting at least a portion of at least one of the first and second regions of build material. In some embodiments, the first and second regions of support material are formed from the same support material. Such second regions of support material, in some instances, can be temporary regions of support material that may not be included in a finished 3D article, as described hereinabove in Section I.

Moreover, it is also possible, in some cases, to replace a first region of support material described herein with an additional region of build material, such as a third region of build material. In some cases, such an additional region of build material is formed from a build material that is differently colored than the build material used to form the first and/or second region of build material. In some embodiments, the build material of the third region of build material comprises a white build material. Further, in some cases, the build material of the first and/or second region of build material is a non-white build material.

Similarly, in some embodiments, a region of support material and/or a region of build material described herein may also be at least partially replaced by a region of voids or may include voids.

IV. Printed 3D Articles Comprising a Full-Color Pattern

In another aspect, printed 3D articles comprising a full-color or CMY colorization pattern are described herein. In some embodiments, such a printed 3D article comprises a first region of build material; a first region of support material; and a second region of build material, wherein the first region of support material is disposed between the first region of build material and the second region of build material in a z-direction of the article, wherein the first and/or second region of build material is formed from a mixture or combination of one or more of a first build material having a cyan color, a second build material having a magenta color, and a third build material having a yellow color under ordinary illumination by visible white light, and wherein the first region of support material is formed from a support material having a white color under ordinary illumination by visible white light. In addition, in some cases, the first region of support material forms a CMY color pattern in combination with the first region of build material and/or the second region of build material, including in a manner described hereinabove in Section II. For example, in some embodiments, the CMY color pattern is a two-dimensional pattern formed on an exterior surface of the article or a three-dimensional pattern visible through an exterior surface of the article.

Further, in some cases, the first and/or second portion of build material of an article described herein is optically transparent or substantially optically transparent. Moreover, in some embodiments, the support material of an article described herein is white. A non-white support material may also be used.

An article having a structure described herein can exhibit various CMY color patterns, as described hereinabove in Section II. For example, in some cases, the CMY color pattern of an article described herein is formed by a variation of the thickness of the first region of support material and/or the thickness of the second region of build material in one or more lateral directions. In other cases, the CMY color pattern of an article comprises a stochastic distribution of spatially discrete sub-regions of support material. In some embodiments, the CMY color pattern comprises an ordered array of spatially-discrete sub-regions of support material. Similarly, in some cases, the CMY color pattern of an article is formed by a variation of the spatial density and/or weight percent of the first region of support material relative to the surrounding first and second regions of build material in one or more lateral directions. For example, in some instances, the CMY color pattern comprises a halftone pattern formed from a plurality of dots of the support material.

Further, in some embodiments, the first region of support material may also provide a texture or gloss to an exterior surface of a 3D article described herein. For example, in some such instances, a printed 3D article comprises a first region of build material; a first region of support material; and a second region of build material, wherein the first region of support material is disposed between the first region of build material and the second region of build material in a z-direction of the article, and wherein the first region of support material forms a texture or gloss pattern in combination with the first region of build material and/or the second region of build material. In some cases, the texture or gloss pattern is formed from a plurality of selectively deposited dots of the support material. The dots can have any size, shape, and/or spatial density not inconsistent with the objectives of the present disclosure. Moreover, in some embodiments, the texture or gloss pattern is formed from an ordered array of selectively deposited dots of support material.

In addition, an article described herein, in some cases, further comprises one or more second regions of support material supporting at least a portion of at least one of the first and second regions of build material. In some embodiments, the first and second regions of support material are formed from the same support material. Such second regions of support material, in some instances, can be temporary regions of support material that may not be included in a finished 3D article, as described hereinabove in Sections I and II.

Some embodiments described herein are further illustrated in the following non-limiting examples.

Example 1

3D Article Having a Grayscale Pattern

Figure 8:
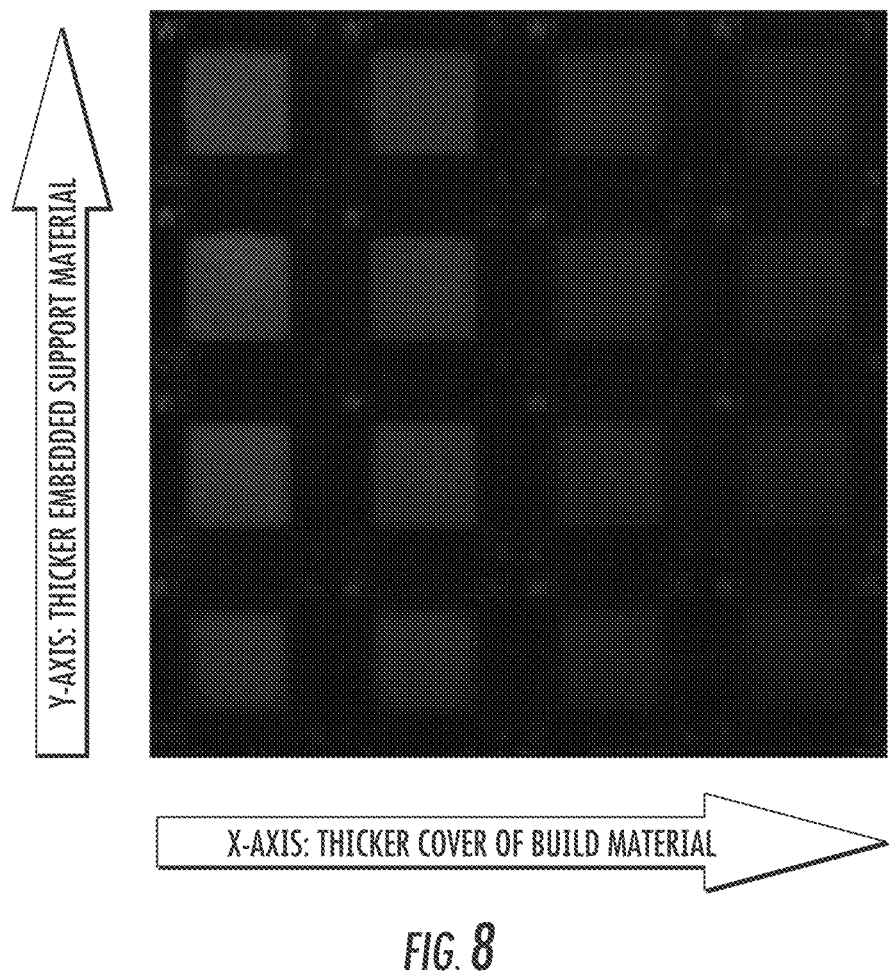
FIG. 8 illustrates a top plan view of a 3D article according to one embodiment described herein.

A 3D article having a grayscale colorization pattern according to one embodiment described herein was formed as follows. Specifically, a 3D article having a structure corresponding to a combination of the general structures of FIGS. 1 and 2 was prepared. In particular, a 3D article having a substantially planar exterior surface was printed using a VisiJet Navy build material available from 3D Systems, Inc., and a white support material. Printing was carried out using a ProJet 3500 printer from 3D Systems, Inc. FIG. 8 illustrates a photograph of a top plan view of the exterior surface of the article illuminated by front lighting. The surface included 16 cells defining a full factorial design of experiment (DOE). Along the y-direction, the thickness of the embedded support material (i.e., the first region of support material) was varied. Along the x-direction, the thickness of the covering build material (i.e., the second region of build material) was varied. As illustrated in FIG. 8, a grayscale pattern was created by controlling these two factors. The thickness or depth of the covering build material affected the darkness (i.e., the blueness or "Navyness" of the surface of the article) more than the thickness of the embedded support material did. The thickness dimensions used are shown on the article in FIG. 8 and were 0.5 mm, 1 mm, 2 mm, and 3 mm for each of the two thicknesses. Although the article of this Example was formed from a white support material and a navy build material, it is to be understood that other color combinations may also be used. For example, in other cases, a white support material is used with a black build material.

Example 2

3D Articles Having a Grayscale Pattern

Figure 9:
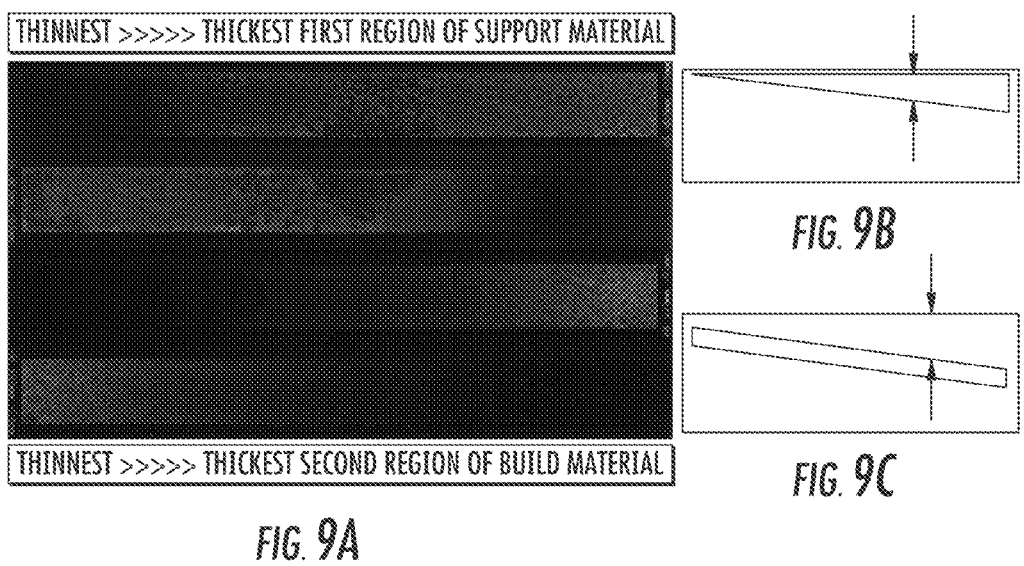
FIG. 9A illustrates a top plan view of 3D articles according to some embodiments described herein.
FIGS. 9B and 9C illustrate schematic representations of the articles of FIG. 9A.

Three-dimensional articles having grayscale colorization patterns according to some embodiments described herein were formed as follows. First, a 3D article having a structure corresponding to the general structure of FIG. 1 was prepared. Next, a 3D article having a structure corresponding to the general structure of FIG. 2 was prepared. The 3D articles each had a substantially planar exterior surface. The articles were printed using a ProJet 3500 printer having a two-channel print head. Specifically, the printer was equipped with a white support material channel and a colored build material channel. FIG. 9A illustrates a photograph of the exterior surface of the articles illuminated by front lighting. The top two grayscale sweeps or patterns in FIG. 9A were created by varying the thickness of the support material (with a constant 0.5 mm build material covering), as illustrated schematically in FIG. 9B. The bottom two grayscale sweeps were created by varying the thickness of the build material (with a constant 0.5 mm support material thickness), as illustrated schematically in FIG. 9C. Moving from left to right, the top sweep lightens because the thickness of the embedded support material increases. For reference, the support material on the top left (the white point) is about 0.5 mm thick. In contrast, in the third sweep down, the sweep starts out dark on the left because the thickness of the covering build material is at a maximum (3 mm). As this sweep progresses from left to right, the covering material gets thinner (from 3 mm down to 0.5 mm) and the sweep lightens significantly.

Example 3

3D Article Having a Grayscale Pattern

Figure 10:
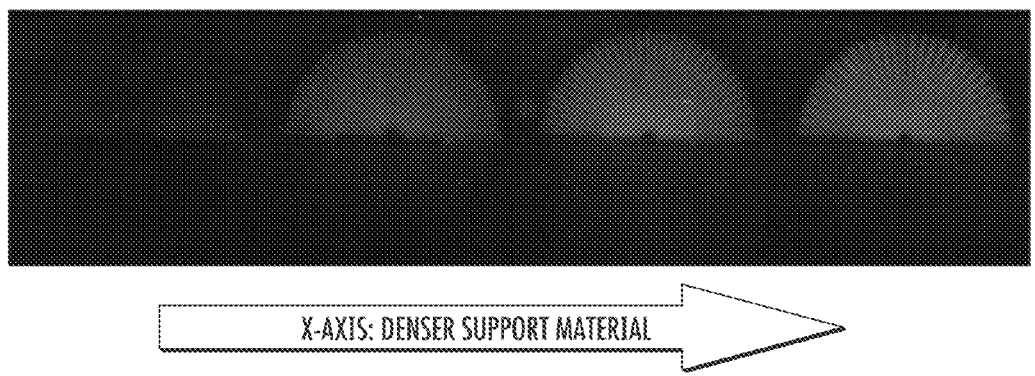
FIG. 10 illustrates a top plan view of a 3D article according to one embodiment described herein.

A 3D article having a grayscale colorization pattern according to one embodiment described herein was formed as follows. A 3D article having a substantially planar exterior surface was printed using a white support material, a non-white build material, and a two-channel ProJet 3500 printer. The article included four cells for comparative purposes. FIG. 10 illustrates a photograph of the exterior surface of the article illuminated by front lighting. The lightest cell on the right is composed of equal weighting of build and support material. Specifically, 3-degree wedges of support material form a first region of support material, and 3-degree wedges of build material form a second region of build material. Moving from right to left in FIG. 10, the percentage of support material is reduced. Specifically, the additional cells included support material wedges of 2 degrees, 1 degree, and 0.5 degrees, respectively from right to left. As illustrated in FIG. 10, varying the relative amount of the first region of support material in this manner provided a grayscale pattern on the surface of the article.

Example 4

3D Articles Having a Grayscale Pattern

Figure 11:
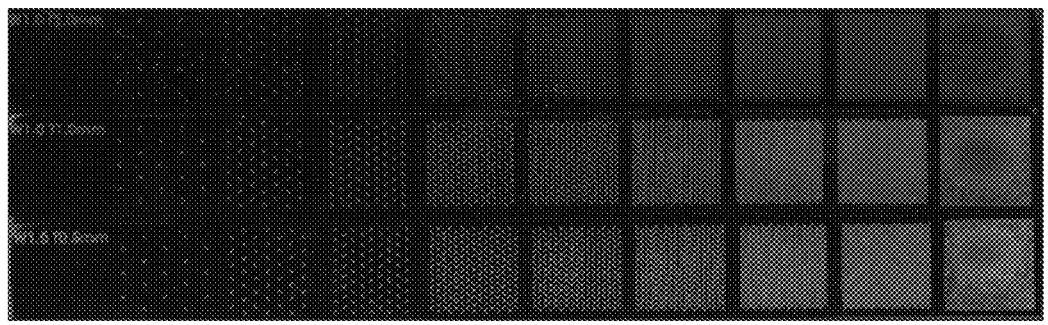
FIG. 11 illustrates a top plan view of 3D articles according to some embodiments described herein.
Figure 12A:
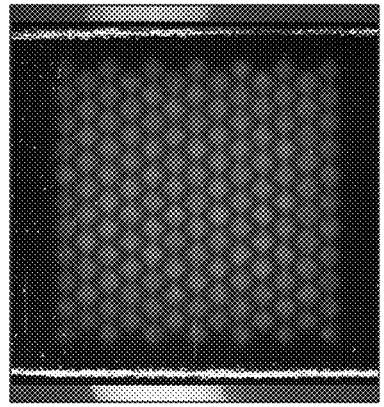
FIGS. 12A-D each illustrates a top plan view of a 3D article according to one embodiment described herein.
Figure 12B:
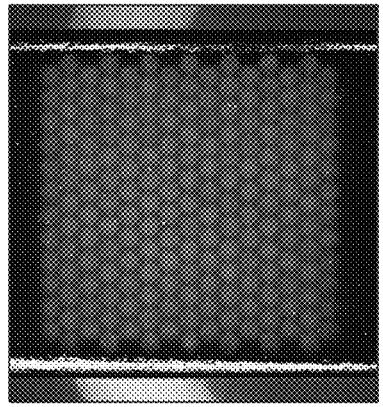
Figure 12C:
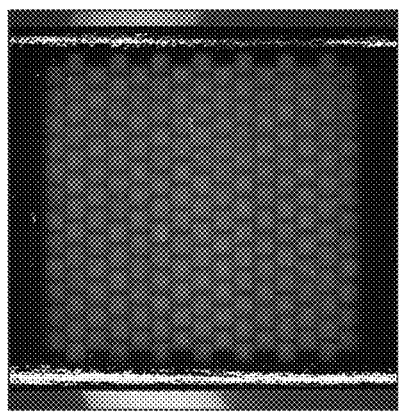
Figure 12D:
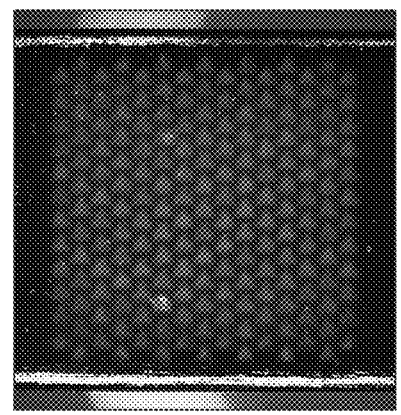
Figure 13A:
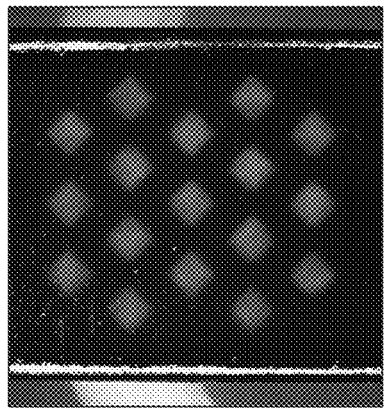
FIGS. 13A-D each illustrates a top plan view of a 3D article according to one embodiment described herein.
Figure 13B:
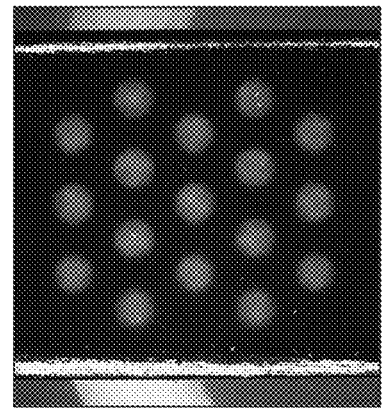
Figure 13C:
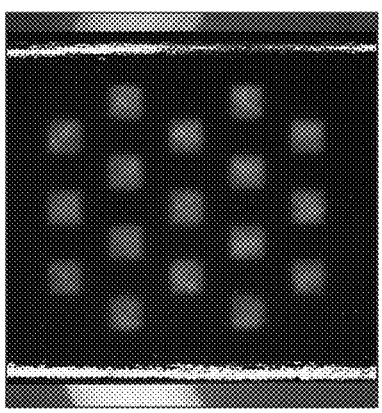
Figure 13D:
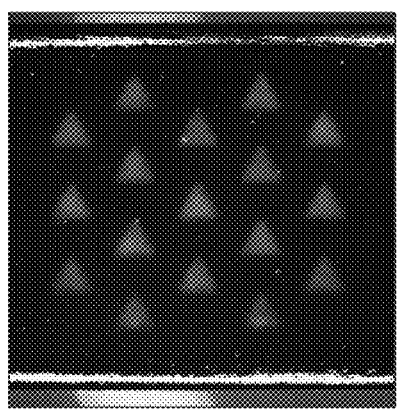

Three-dimensional articles having grayscale colorization patterns according to some embodiments described herein were formed as follows. The 3D articles had a structure corresponding to the general halftone structure of FIG. 6. In addition, the 3D articles each had a substantially planar exterior surface. The articles were printed using a ProJet 3500 printer having a two-channel print head. Specifically, the printer was equipped with a white support material channel and a non-white build material channel. FIG. 11 illustrates a photograph of the exterior surfaces of the bar-shaped articles illuminated by front lighting. The bars from top to bottom had 2 mm, 1 mm, and 0.5 mm, respectively, of build material covering a first region of support material. The left sides of the bars show a halftone having zero percent support material. The right sides of the bars had the highest percentage of support material. The squares on the far right included no build material structure and were instead simply solid squares of support material for comparison purposes. The 3D articles of FIG. 11 illustrate the combination of halftone patterning with build material region thickness to create gray values. Other combinations of grayscale patterning methods described herein are also possible. Further, in the embodiment of FIG. 11, the selectively deposited dots of support material in the halftone pattern were 0.5 mm in diameter. However, smaller or larger dot sizes may also be used. In addition, as described hereinabove, the 3D shapes of the dots can also be used as a variable for creating a desired visual value, effect, or colorization pattern. For example, dots can be small and pointed toward the exterior surface. Alternatively, the dots can be flat and rounded.

Example 5

3D Articles Having a Surface Texture or Gloss

Three-dimensional articles having a surface texture or gloss according to some embodiments described herein were formed as follows. The 3D articles had a structure corresponding to the general structure of FIG. 7. In addition, the 3D articles each had a substantially planar exterior surface. The articles were printed using a ProJet 3500 printer having a two-channel print head. Specifically, the printer was equipped with a white support material channel and a non-white build material channel. FIGS. 12 and 13 each illustrate photographs of the exterior surfaces of the articles illuminated by front lighting. Specifically, FIGS. 12A-D illustrate four different patterns (diamond-shaped dots in FIG. 12A, round dots in FIG. 12B, square dots in FIG. 12C, and triangular dots in FIG. 12D). These four patterns could be printed with four different sizes of dots to create 16 different surface colorization/texture patterns. Moreover, additional levels of texture and/or grayscale gradient could be achieved through varying the density of the patterns. For example, FIGS. 13A-D illustrate the same patterns as FIGS. 12A-D, but at a different spatial density.

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed:

1. A method of printing a three-dimensional article comprising:
    selectively depositing a first portion of build material in a fluid state onto a substrate to form a first region of build material;
    selectively depositing a first portion of support material in a fluid state to form a first region of support material; and
    selectively depositing a second portion of build material in a fluid state to form a second region of build material,
    wherein the first region of support material is disposed between the first region of build material and the second region of build material in a z-direction of the article, and wherein the first region of support material forms a grayscale pattern in combination with the first region of build material and/or the second region of build material.

2. The method of claim 1, wherein the first and second portions of the build material are deposited from a first channel of a print head of a three-dimensional printing system, and the support material is deposited from a second channel of the print head.

3. The method of claim 1, wherein the first region of support material is completely or substantially completely covered by the second region of build material in a z-direction.

4. The method of claim 1, wherein the first and/or second portion of build material comprises a colorant.

5. The method of claim 4, wherein the first portion of build material comprises one or more first colorants and the second portion of build material comprises one or more second colorants.

6. The method of claim 1, wherein the first and second regions of build material are formed from the same build material or combination of build materials.

7. The method of claim 1, wherein the second portion of build material is optically transparent or substantially optically transparent.

8. The method of claim 1, wherein the support material is white.

9. The method of claim 1, wherein the grayscale pattern is formed by varying the thickness of the first region of support material and/or the thickness of the second region of build material in one or more lateral directions.

10. The method of claim 1, wherein the grayscale pattern comprises a stochastic distribution of spatially discrete sub-regions of support material.

11. The method of claim 1, wherein the grayscale pattern comprises an ordered array of spatially-discrete sub-regions of support material.

12. The method of claim 1, wherein the grayscale pattern comprises a halftone pattern formed from a plurality of selectively deposited dots of the support material.

13. The method of claim 1, wherein the grayscale pattern is formed by varying the spatial density and/or weight percent of the first region of support material relative to the surrounding first and second regions of build material in one or more lateral directions.

14. The method of claim 1, wherein one or more of the first and second regions of build material and the first region of support material is deposited according to an image of the three-dimensional article in a computer readable format.

15. The method of claim 1 further comprising curing the first and/or second region of build material.

16. The method of claim 15 further comprising cooling the three-dimensional article to solidify the first region of support material.

17. The method of claim 1 further comprising supporting at least a portion of at least one of the first and second regions of build material with one or more second regions of support material.

18. The method of claim 17, wherein the first and second regions of support material are formed from the same support material.

19. The method of claim 17, wherein the method is carried out by a three-dimensional printer having a two-channel print head.

20. The method of claim 9, wherein the grayscale pattern is formed by continuously varying the thickness of the first region of support material and/or the thickness of the second region of build material in one or more lateral directions.

21. The method of claim 1, wherein:
    the first and/or second portion of build material is formed from a mixture or combination of one or more of a first build material having a cyan color, a second build material having a magenta color, and a third build material having a yellow color, and
    the first portion of support material is formed from a support material having a white color.

* * * * *